United States Patent
Eskew

(10) Patent No.: US 10,088,311 B2
(45) Date of Patent: Oct. 2, 2018

(54) ANALOG FLOATING-GATE INCLINOMETER

(71) Applicant: Texas Instruments Incorporated, Dallas, TX (US)

(72) Inventor: Mark Eskew, Carrollton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 184 days.

(21) Appl. No.: 15/266,119

(22) Filed: Sep. 15, 2016

(65) Prior Publication Data

US 2018/0073874 A1      Mar. 15, 2018

(51) Int. Cl.
*G01C 9/18*        (2006.01)
*G01C 9/06*        (2006.01)

(52) U.S. Cl.
CPC .............. *G01C 9/18* (2013.01); *G01C 9/06* (2013.01); *G01C 2009/062* (2013.01); *G01C 2009/182* (2013.01)

(58) Field of Classification Search
CPC ........ G01C 2009/062; G01C 2009/182; G01C 9/06; G01C 9/18

USPC ....................................................... 33/366.19
See application file for complete search history.

(56) References Cited

U.S. PATENT DOCUMENTS

| | | | | |
|---|---|---|---|---|
| 2007/0261258 A1* | 11/2007 | Ahn | ......................... | G01C 9/06 |
| | | | | 33/366.19 |
| 2014/0082954 A1* | 3/2014 | Chen | ......................... | G01C 9/20 |
| | | | | 33/366.19 |
| 2015/0377811 A1 | 12/2015 | Mitchell et al. | | |
| 2018/0073874 A1* | 3/2018 | Eskew | ..................... | G01C 9/18 |
| 2018/0130901 A1* | 5/2018 | Mitchell | .............. | A01G 25/167 |

* cited by examiner

*Primary Examiner* — Yaritza Guadalupe-McCall
(74) *Attorney, Agent, or Firm* — Andrew R. Ralston; Charles A. Brill; Frank D. Cimino

(57) ABSTRACT

An analog floating-gate (AFG) inclinometer where a plurality of AFG sensors are provided to detect the presence of a discharge caused by settling of a conductive liquid droplet contained in a sealed microchannel under gravity. A plurality of sensor port electrodes associated with the AFG sensors are placed along the length of a curved sealed microchannel of the inclinometer at specific positions calibrated to corresponding angular inclinations. Discharge detected at a specific AFG sensor port during measurement due to the movement of the conductive liquid droplet under gravity is used in determining a surface inclination being measured.

20 Claims, 15 Drawing Sheets

ANALOG FLOATING-GATE INCLINOMETER

FIELD OF THE DISCLOSURE

This disclosure relates generally to the field of semiconductor sensors and the methods of fabrication thereof, and more particularly, without limitation, to an analog floating-gate inclinometer and its fabrication.

BACKGROUND

An inclinometer or clinometer is an instrument for measuring angles of slope (or tilt), elevation or depression of an object or surface with respect to gravity. It is also known as a tilt meter, slope gauge, gradient meter or gradiometer, level gauge or level meter, and the like, typically depending on the field of use or application. Although mechanical inclinometers have been known for a long time, the field of electronic sensor-based inclinometers and related instrumentation is relatively recent, where improvements in performance and reliability are continually being sought. Whereas advanced tilt sensors using micro-electro-mechanical systems (MEMS)-based components such as proof masses with electrodes, springs and fixed electrodes have been developed, there remains a need for electronic inclinometers that offer better performance, for example in terms superior sensor zero offset and sensitivity, sensor linearity, hysteresis, repeatability, and the temperature drift, in a cost-effective manner. Moreover, there is a further need for tilt instrumentation that permits fast and accurate measurements of inclination in both un-powered and/or low-powered conditions, thereby enabling deployment in a variety of applications.

As the advances in the design of integrated circuits and semiconductor fabrication continue to take place, improvements in semiconductor-based sensor technologies, including electronic inclinometers, are also being concomitantly pursued.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

Embodiments of the present invention are broadly directed to an analog floating-gate (AFG) inclinometer and fabrication thereof, wherein a plurality of AFG sensors are provided to detect the presence of a discharge caused by the settling of a conductive liquid droplet contained in a sealed microchannel under gravity. A plurality of sensor port electrodes associated with the AFG sensors are placed along the length of a curved sealed microchannel of the inclinometer at specific positions calibrated to corresponding angular inclinations. In one implementation, discharge detected at a specific AFG sensor port during measurement due to the movement of the conductive liquid droplet under gravity is used in determining a surface inclination being measured.

In one aspect, an embodiment of an inclinometer is disclosed which comprises, inter alia, a semiconductor substrate and a dielectric layer disposed over the semiconductor substrate, the dielectric layer defining a sealed arcuate microchannel that contains a conductive liquid droplet. Access port electrodes are provided in the sealed arcuate microchannel, wherein each of the access port electrodes is associated with a reference electrode within a proximity of the respective access port electrode and disposed along a curvature of the sealed arcuate microchannel. In one embodiment, the access port electrodes are spaced from one another with an arc length that is calibrated to an angular inclination resolution. The inclinometer also includes analog floating-gate (AFG) devices formed in the semiconductor substrate, each corresponding to one or access port electrodes, wherein each of the AFG devices comprises a first conductor electrically coupled to the corresponding access port electrode and a second conductor electrically coupled to the reference electrode associated with the corresponding access port electrode. An example inclinometer may also comprise or otherwise be associated with a control circuit coupled to each of the AFG devices, the control circuit configured to: (i) detect a discharge current in at least one of the AFG devices along a conductive path between the corresponding access port electrode and the associated reference electrode interposed by the conductive liquid droplet, and (ii) determine an angular inclination measurement based on the detection of the discharge current of the at least one of the AFG devices.

In another aspect, an embodiment of a method of fabricating an AFG-based inclinometer is disclosed. The claimed method comprises, inter alia, forming a plurality of AFG sensor devices in a semiconductor substrate, wherein each of the AFG devices comprises a first conductor and a second conductor, the number of AFG devices being dependent upon, e.g., desired angular measurement resolution, maximum measurement range of angular inclination, sizing/shape of a sealed microchannel, etc., depending on implementation. In one example embodiment, the method comprises forming or otherwise defining an arcuate microchannel in a dielectric layer disposed over the semiconductor substrate containing the AFG devices, wherein the arcuate microchannel includes access port electrodes, each of the access port electrodes associated with a reference electrode formed within a proximity of the respective access port electrode and disposed along a curvature of the arcuate microchannel, the access port electrodes spaced from one another with an arc length that is calibrated to an angular inclination resolution. In one arrangement, the first and second conductors of the AFG devices are operative as corresponding access port electrodes and reference electrodes, respectively. In another arrangement, the first and second conductors of the AFG devices may be electrically coupled to corresponding access port electrodes and reference electrodes via respective conductive paths. An electrical connection path may therefore be provided for coupling each access port electrode to the first conductor of a corresponding AFG device and another electrical connection path for coupling the reference electrode associated with the access port electrode to the second conductor of the corresponding AFG device. A suitable conductive liquid droplet (e.g., having desirable electrical conductive properties, physical/chemical properties, etc.) may be injected or otherwise introduced into the arcuate microchannel, which is then sealed with a cap structure. In one arrangement, the cap structure may comprise an inverted semiconductor wafer having one or more dielectric layers. Further, the conductive liquid droplet may be dimensioned to move freely within the sealed arcuate microchannel under gravity. An example fabrication method may also comprise providing a control circuit coupled to each of the AFG devices for performing one or more functions as set forth in additional detail hereinbelow.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
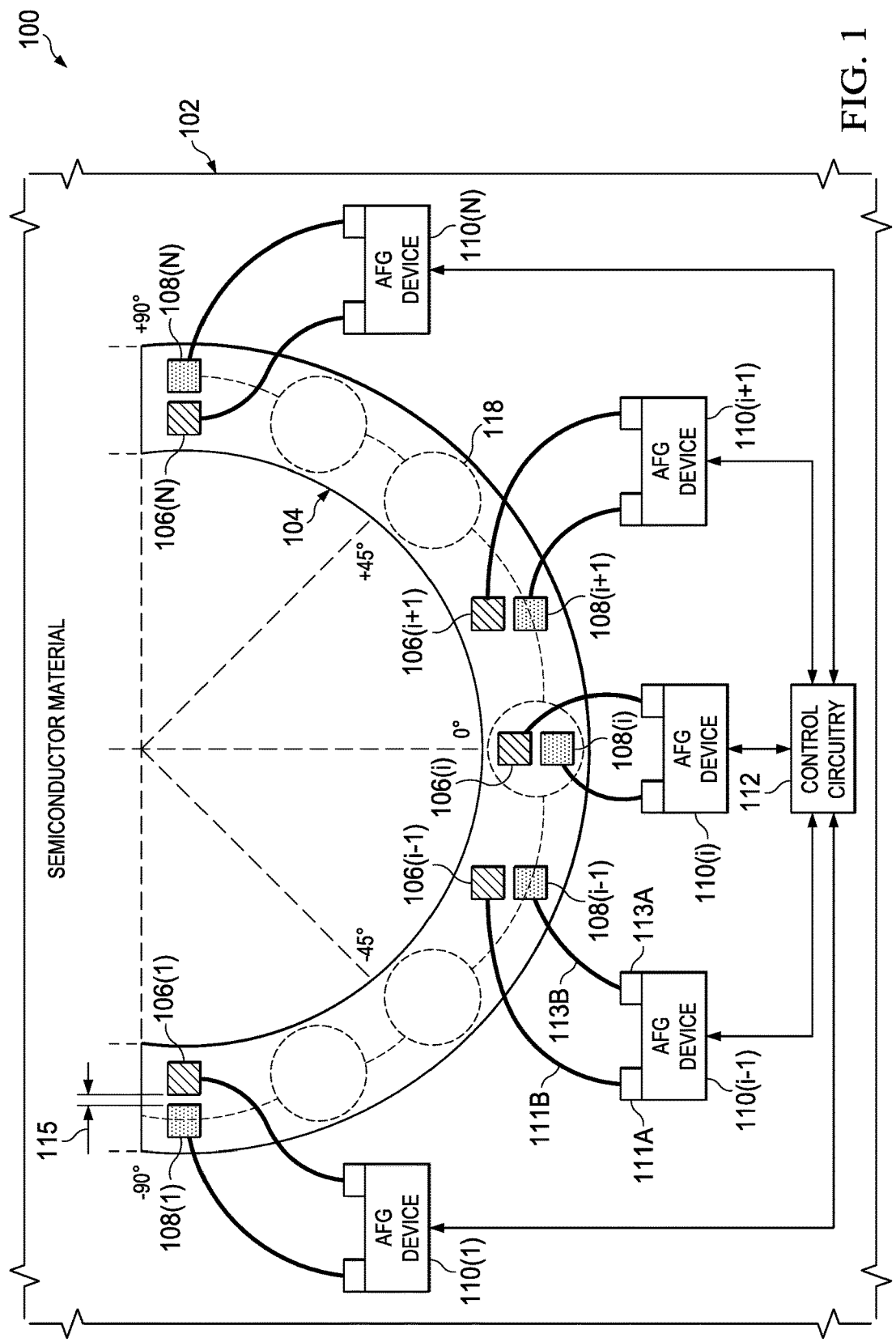
FIG. 1 depicts an example AFG-based inclinometer according to an embodiment of the present invention.

The present invention is described with reference to the attached Figures wherein like reference numerals are generally utilized to refer to like elements throughout. The Figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In the following description, reference may be made to the accompanying drawings wherein certain directional terminology, such as, e.g., "upper", "lower", "top", "bottom", "left-hand", "right-hand", "front side", "backside", "vertical", "horizontal", etc., may be used with reference to the orientation of the Figures or illustrative elements thereof being described. Since components of embodiments can be positioned in a number of different orientations, the directional terminology is used for purposes of illustration and is in no way limiting. Likewise, references to features referred to as "first", "second", etc., are not indicative of any specific order, importance, and the like, and such references may be interchanged mutatis mutandis, depending on the context, implementation, etc. It is understood that further embodiments may be utilized and structural or logical changes may be made without departing from the scope of the present invention. The features of the various exemplary embodiments described herein may be combined with each other unless specifically noted otherwise.

As employed in this specification, the terms "coupled", "electrically coupled", "connected" or "electrically connected" are not meant to mean that elements must be directly coupled or connected together. Intervening elements may be provided between the "coupled", "electrically coupled", "connected" or "electrically connected" elements.

Example semiconductor devices described below may include or formed of a semiconductor material like Si, SiC, SiGe, GaAs or an organic semiconductor material. The semiconductor material may be embodied as a semiconductor wafer or a semiconductor chip containing a number of analog floating-gate (AFG) integrated circuits, input/output and control circuitry, as well as microprocessors, microcontrollers, and/or micro-electro-mechanical components or systems (MEMS), inter alia. The semiconductor chip may further include inorganic and/or organic materials that are not semiconductors, for example, insulators such as dielectric layers, plastics or metals, etc.

Referring now to the drawings and more particularly to FIG. 1, depicted therein is an example AFG-based inclinometer 100 that may be fabricated in a suitable semiconductor material 102 as a semiconductor product or device according to an embodiment of the present invention. A sealed microchannel 104 fabricated in a dielectric layer over a semiconductor substrate is configured to contain a conductive liquid droplet 118 of a suitable dimension that is arranged to move freely within the microchannel 104 under the influence of gravity. Preferably, the sealed microchannel 104 is shaped in a curvilinear or arcuate form, which may comprise at least a portion of a suitable geometric shape, e.g., a circle, a semicircle, a quarter circle, a parabolic or ellipsoidal arc, and the like. A plurality of sensor access port electrodes 106(1) to 106(N) and corresponding reference electrodes 108(1) to 108(N) may be positioned along a curvature of the microchannel 104 such that the access port electrodes 106(1) to 106(N) are spaced from one another with a specific arc length that is calibrated to a particular angular inclination resolution, as will be described in additional detail below. In one implementation, the angular inclination may be calibrated in degrees or radians of angle. In another implementation, the angular inclination may be calibrated in a gradient or slope percentage, or tilt, and the like. A plurality of analog floating-gate (AFG) sensor devices or integrated circuits 110(1) to 110(N) are formed in the semiconductor substrate corresponding to the plurality of access port electrodes 106(1) to 106(N) and associated reference electrodes 108(1) to 108(N), for example in a one-to-one correspondence, wherein each of the AFG devices comprises a first conductor electrically coupled to the corresponding access port electrode and a second conductor electrically coupled to the reference electrode associated with the corresponding access port electrode for ground or discharge. By way of example, AFG sensor device 110(i-1) is provided with a first conductor 111A coupled to the corresponding access port electrode 106(i-1) and a second conductor 113A coupled to the corresponding reference port electrode 108(i-1), via respective connective paths 111B and 113B. One skilled in the art will recognize upon taking reference to this drawing Figure in conjunction with the other drawing Figures that although elongated connective paths 111B and 113B are illustrated in FIG. 1, first and second conductors 111A/113A of AFG 110(i-1) may be fabricated in a vertically integrated process flow (e.g., for better manufacturability) to operate as corresponding access port and reference electrodes 106(i-1), 108(i-1), as will be set forth in reference to an example implementation with additional details hereinbelow.

Inclinometer 100 may further include or be otherwise associated with a control circuit 112 that may be formed in the same semiconductor substrate material as part of the AFG devices or separately. Regardless of how the control circuit 112 is coupled to or otherwise associated with the AFG devices 110(1) to 110(N), the control circuit 112 is preferably configured to perform, inter alia: detection of a discharge current in at least one of the AFG devices along a conductive path between the corresponding access port electrode and the associated reference electrode interposed by the conductive liquid droplet (e.g., when the access port electrode and the associated reference electrode coupled to the corresponding AFG devices are in an electrical conductive relationship due to a conductive path formed therebetween by the conductive liquid droplet 118 settled to cover at least the specific access port electrode and associated reference electrode under gravity, for instance, depending on inclination when the inclinometer is positioned on a surface for measurement). The control circuit 112 may also be configured to determine an angular inclination measurement based on the detection of the discharge current of the at least one of AFG devices, e.g., by way of correlation of the position of the discharging AFG device(s) and its calibrated angular inclination, interrogation of a look-up table, and the like.

In one arrangement, reference electrodes 108(N) may be formed within a select proximity of the corresponding access port electrodes 106(N), which may be termed inter-electrode distance 115, such that the conductive liquid droplet 118 may be sized to cover only one access port electrode and corresponding reference electrode when the conductive liquid droplet 118 is settled at that access port electrode under gravity. In another arrangement, the conductive liquid droplet 118 may be sized to cover more than one access port electrode and corresponding reference electrodes for providing respective conductive paths therebetween when the conductive liquid droplet is settled under gravity. In such an arrangement, the control circuit 112 may be configured to detect discharge currents in multiple AFG devices coupled to the respective multiple access port electrodes covered by the conductive liquid droplet 118 and determine a specific angular inclination measurement based on respective positions of the multiple access port electrodes along the curvature of the sealed arcuate microchannel 104.

Additional details concerning the functionality of the control circuit 112, configuration and placement of access port and reference electrodes, fabrication of example AFG devices and associated microchannel, and calibration of an example inclinometer during manufacture will be set forth below, taking reference to the remaining drawing Figures that are illustrative of various views and embodiments of the present invention.

Figure 2:
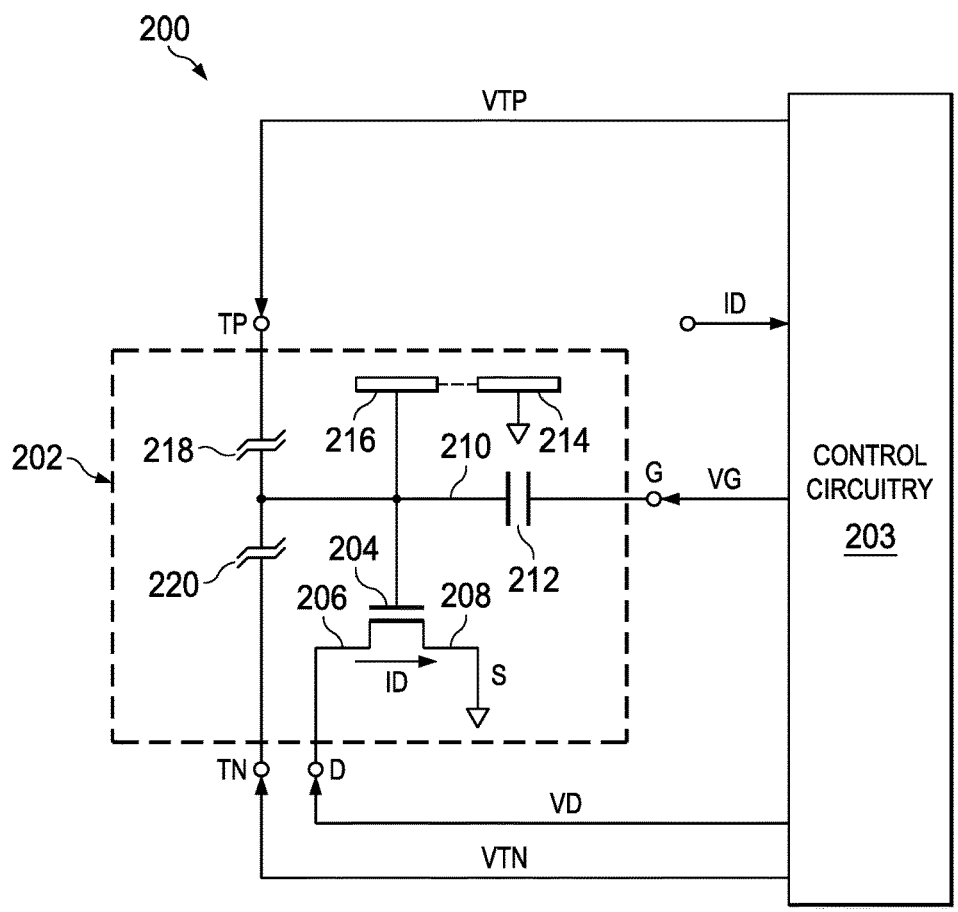
FIG. 2 is an electrical circuit diagram of an AFG sensor device or integrated circuit that may be used in an inclinometer embodiment of FIG. 1 according to the teachings of the present invention in an example implementation.

FIG. 2 depicts an electrical circuit diagram of an AFG sensor device 200 that may be used in an inclinometer embodiment of FIG. 1 according to the teachings of the present invention in an example implementation. In this example, AFG sensor device 200 is arranged in the form of a subsystem, including integrated circuit 202, in which control circuitry 203 that may be part of or an embodiment of, or otherwise associated with the control circuit 112 of FIG. 1. As can be seen from FIG. 2, control circuitry 203 may be coupled to various nodes of integrated circuit 202 for applying various control signals and monitor electrical parameters to carry out the functions described in further detail below. Such functions may include but not limited to appropriately biasing the integrated circuit 202, (re)charging and erasure of a floating gate, and monitoring of discharge currents, for example. As noted above, control circuitry 203 may be realized in whole or in part as separate circuitry deployed within the subsystem of sensor device 200, which may be disposed in communication with external processor circuitry and/or nodes. In some realizations, all or part of control circuitry 203 may be implemented into integrated circuit 202 itself, along with analog floating-gate functionality. In any event, it is contemplated that those skilled in the art having reference to this specification will be readily able to implement control circuitry 203 in the manner appropriate for carrying out the functions described herein, using the available and appropriate technology for the particular architecture to be used.

Integrated circuit 202 preferably includes an analog floating-gate circuit and structure in connection with which embodiments of the present invention may be used. Preferably, an example analog floating-gate circuit includes an electrically floating electrode, designated as floating-gate electrode 210 in the arrangement of FIG. 2, which serves multiple functions. One function of analog floating-gate electrode 210 in the circuit 202 of FIG. 2 is operating as a plate of storage capacitor 212. According to this embodiment, another plate of storage capacitor 212 receives a gate voltage VG from control circuitry 203 at terminal G (e.g., control gate), such that charge can be stored by storage capacitor 212 under suitable biasing voltages. Another function of floating-gate electrode 210 is operating as a gate of a metal-oxide-semiconductor (MOS) transistor 204, which may be an n-channel or p-channel device, based on suitable CMOS technology. In the example of FIG. 2 depicting an n-channel device, a drain 206 of transistor 204 at drain terminal D receives drain voltage VD from control circuitry 203, and a source 208 of transistor 204 at source terminal S is biased to a reference voltage, e.g., a ground reference as illustrated. In this arrangement, gate voltage VG applied at terminal G by control circuitry 203 will capacitively couple to floating-gate electrode 210 via storage capacitor 212, with that voltage establishing the voltage at the gate of MOS transistor 204, and thus the extent to which transistor 204 conducts between its drain D and its source S for a given drain-to-source voltage VD.

In the example arrangement of FIG. 2, floating-gate electrode 210 also serves as a plate of each of tunnel capacitors 218, 220. Tunnel capacitors can apply charge to or remove charge from floating-gate electrode 210, thereby "programming" it to a particular analog state. In the example of integrated circuit 202, the plate of tunnel capacitor 218 opposite that of electrode 210 is connected to a terminal TP, while an opposing plate of tunnel capacitor 220 is connected to a terminal TN. The capacitor dielectric for tunnel capacitors 218, 220 is contemplated to be relatively thin, to allow mechanisms such as Fowler-Nordheim tunneling to transfer charge between terminals TP, TN and floating-gate electrode 210, depending on the bias. Although tunnel capacitors 218, 220 may permit both the programming of stored charge onto floating-gate electrode 210 and the removal of that charge ("erase"), as noted above, it is contemplated that only one of these tunnel capacitors 218, 220 may be implemented in some implementations.

In its general operation as an analog floating-gate device, the "programming" of floating-gate electrode 210 is carried out by application of a pulse of an appropriate negative voltage to terminal TN relative to the voltage at terminal TP and to the ground reference voltage at the opposite plate of storage capacitor 212 to cause electrons to tunnel through tunnel capacitor 220. Because of the voltage divider formed by capacitors 218, 220, 212, most of that programming voltage will appear across tunnel capacitor 220, enabling electrons to tunnel through its capacitor dielectric to analog floating-gate electrode 210, and become trapped at floating-gate electrode 210. Conversely, electrons can be removed ("erased") from floating-gate electrode 210 by applying an appropriate positive voltage at terminal TP relative to terminal TN and to the ground reference voltage at the opposite plate of storage capacitor 212. Again, the voltage divider of capacitors 218, 220, 212 is operative such that most of that voltage is caused to appear across tunnel capacitor 218, causing electrons that are trapped on floating-gate electrode 210 to tunnel through its capacitor dielectric to terminal TP. In the analog sense, the duration of the program and erase pulses can be adjusted to precisely set the charge state at floating-gate electrode 210. Following programming and erasure, as the case may be, the extent to which charge is trapped on floating-gate electrode 210 will establish a voltage across storage capacitor 212, and thus a gate voltage for MOS transistor 204 that controls its channel conduction.

Based on the foregoing description and from FIG. 2, control circuitry 203 is coupled to the various terminals of the floating-gate device of integrated circuit 202, including to terminals G, D, TP, TN so as to apply corresponding voltages VG, VD, VTP, VTN, respectively. In this example arrangement, control circuitry 203 monitors the drain current ID conducted by transistor 204, e.g., by detecting the current drawn by its bias of drain voltage VD to directly measure drain current ID. Alternatively, transistor 204 may drive an analog circuit or other function, such as an amplifier, from which control circuitry 203 may obtain a measurement or detect the presence of drain current ID of transistor 204. In an additional or alternative embodiment, control circuitry 203 may also include a timer function, such as a clocked counter or other conventional timer, to provide a time base for the monitoring/detection of drain current ID or its discharge, application of (re)charge pulses after a delay period, etc. as will be described below.

In the illustrated embodiment of FIG. 2, AFG integrated circuit 202 also includes a conductor element 216 (e.g., sense conductor) that is electrically connected to floating-gate electrode 210, and a reference conductor element 214 that is coupled to a reference voltage, such as ground, but is otherwise electrically isolated from conductor element 216 by a predetermined amount of separation or proximity, as well as from other nodes of the analog floating-gate device in integrated circuit 202. As will be evident from the description below, conductor elements 216, 214 may be constituted as metal pads operative as a pair of access port and reference electrodes disposed in a sealed microchannel in accordance with the teachings of the present invention.

Figure 3A:
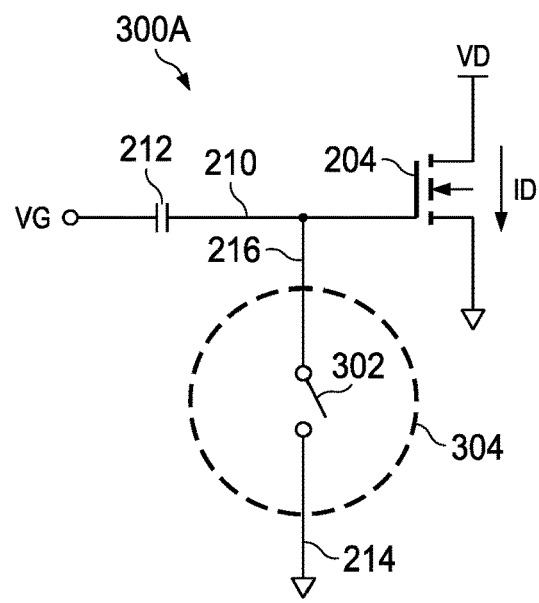
FIG. 3A is an electrical equivalent circuit of an example AFG sensor wherein a discharge may be caused due to a conductive path effectuated by a conductive droplet in an inclinometer according to an embodiment of the present invention.
Figure 3B:
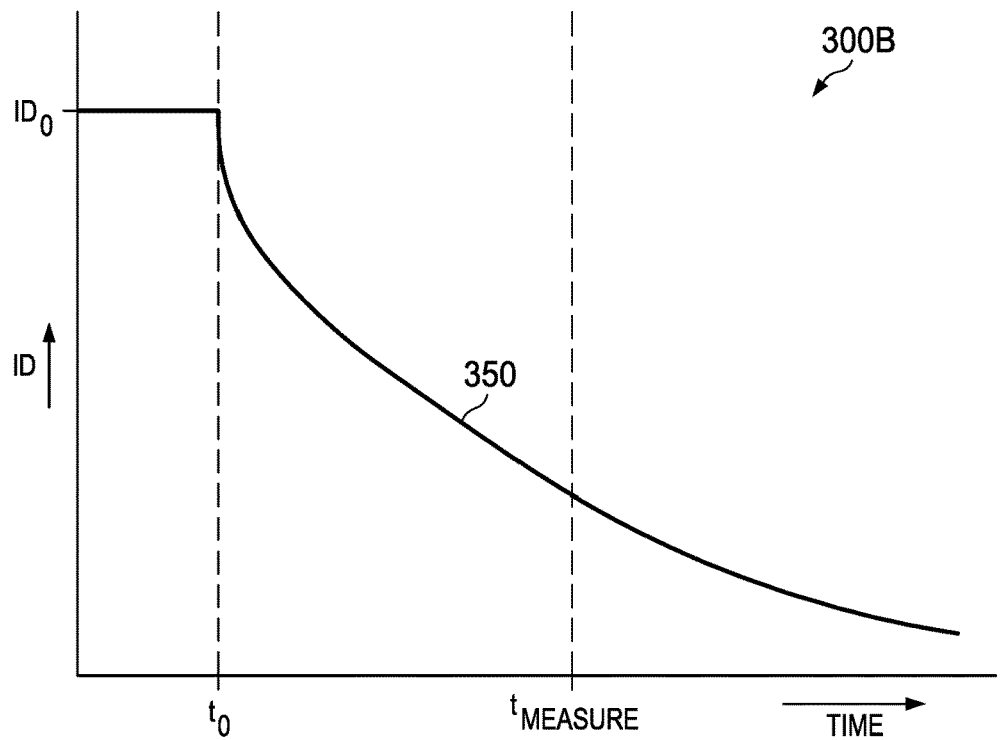
FIG. 3B depicts an example discharge curve in an AFG sensor in an inclinometer configured according to the teachings of the present invention.

FIG. 3A depicts an electrical equivalent circuit 300A of an example AFG sensor wherein a discharge may occur due to a conductive path effectuated by a conductive droplet disposed in the microchannel of an inclinometer according to an embodiment of the present invention. As shown in FIG. 3A, this equivalent circuit 300A includes storage capacitor 212 receiving gate voltage VG, and transistor 204 having its drain biased at voltage VD and its source at ground. The conduction path between conductive element 216 and reference conductive element 214 provided by a conductive liquid droplet 304 (as exemplified by droplet 118 disposed in the sealed microchannel 104 of FIG. 1) may be modeled in this equivalent circuit by the series connection of switch 302 and a fixed resistor (not specifically shown) that may be negligent depending on the conductive properties of the liquid droplet. For example, a highly ionic water droplet may be less resistive than a less ionic water droplet. As one skilled in the art will recognize, conductive properties of a working liquid or fluid for purposes of the present invention will effectuate a conductive path by which the charge of an energized floating gate may be discharged via the path between conductive element 216 and reference conductive element 214 at a rate proportional to the liquid's conductivity. FIG. 3B qualitatively illustrates the operation of this equivalent circuit in terms of the discharge, where an ID discharge curve 350 is illustrated as a function of time in a graph 300B. The initial condition of the circuit of FIG. 3A, prior to time $t_0$ in FIG. 3B, has drain voltage VD and gate voltage VG both above the threshold voltage of transistor 204 (i.e., charged state), while a reference voltage, for example ground, biases each of reference conductor and source nodes. A high fraction (typically on the order of 90%) of the gate voltage VG will capacitively couple to floating-gate electrode 210, turning on transistor 204 and resulting in drain current $ID_0$ being conducted prior to time $t_0$. At this point in the operation, which is prior to the liquid droplet being settled at the particular AFG sensor port, there is no conduction path present between sense conductor element 216 and reference conductor element 214. As such, floating-gate electrode 210 does not discharge to ground, and drain current ID remains constant at the level $ID_0$. When the conductive liquid droplet in the sealed microchannel 104 settles at the particular AFG sensor port (under gravity due to the inclination of a surface at measurement), it provides a conduction path between conductor element 216 and one or more of reference conductor elements 214, which may be illustratively shown as the switch 302 of the equivalent circuit 300A being closed. Charge present at floating-gate electrode 210 will therefore conduct from conductive element 216, through the conduction path of droplet 304 to the ground potential at reference conductor elements 214. As charge is removed from floating-gate electrode 210, the gate potential of transistor 204 drops, thereby causing drain current ID to drop following time $t_0$, as shown in the ID current discharge curve 350 of FIG. 3B.

One skilled in the art will recognize that such a drop in the ID current of an AFG sensor that is part of a plurality of AFG sensors provided at calibrated angular positions of a microchannel may be detected, monitored, measured, or otherwise processed in order to correlate or otherwise determine an angular inclination of a surface. In one example implementation, such operations may be executed as part of the functionality of an inclinometer control circuit, e.g., control circuit 112, as set forth hereinabove. In one embodiment, a determination may be made immediately after a drop in the ID current is detected. In another embodiment, a determination may be made after a certain time has elapsed and/or when the ID current is dropped to a certain level. Where a conductive liquid droplet is sized to cover multiple AFG access ports when settled under the influence of gravity, an example control circuit may be configured to not only detect the presence of ID current drops in respective AFG sensors but also measure the different drop rates, actual current values, and the like, and use that information in a more advanced determination logic (e.g., weighted averages, etc.) in order to arrive at a specific angular inclination measurement based on respective positions of the multiple access port electrodes experiencing the ID current discharges at the time of measurement.

Figure 4:
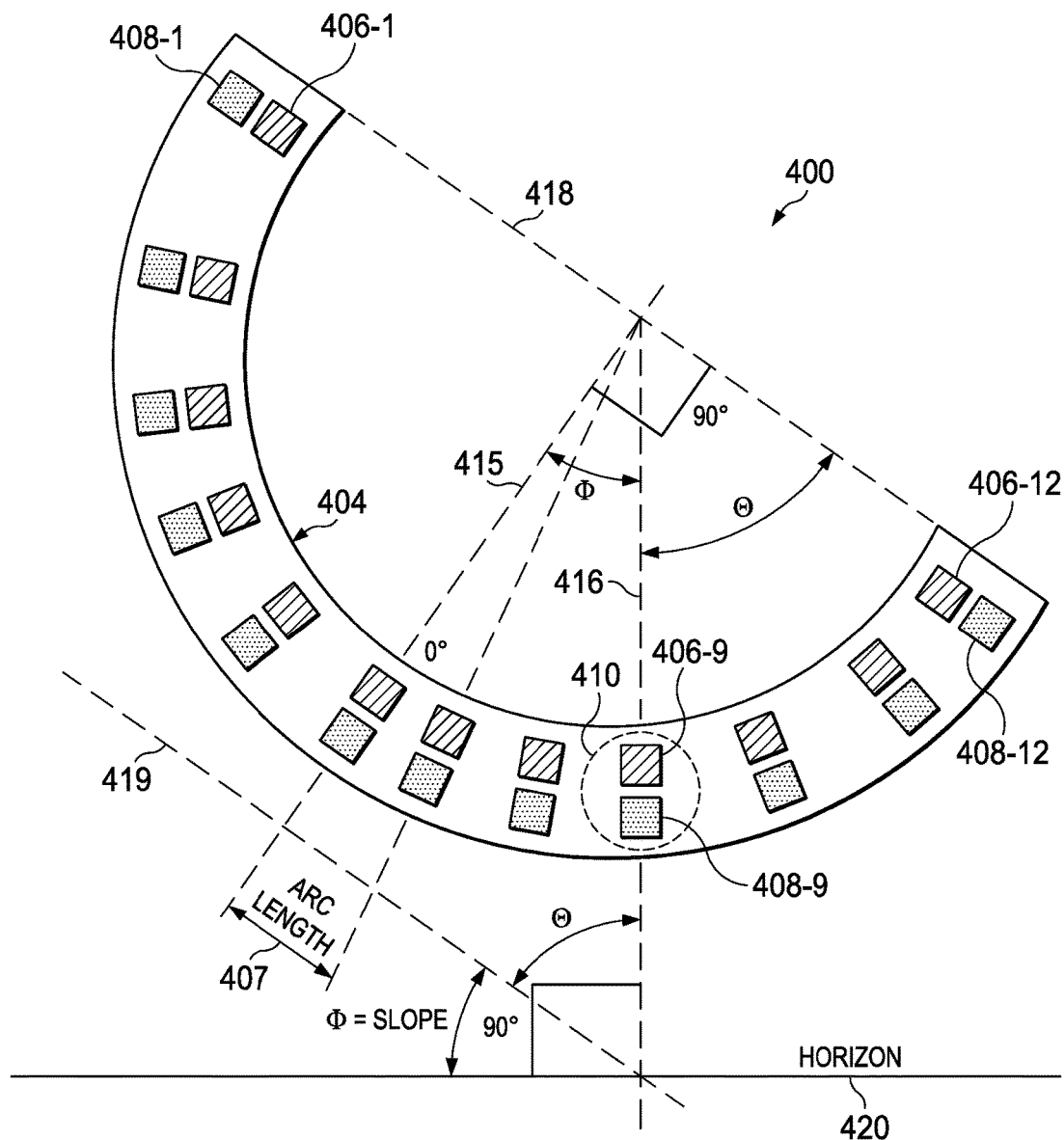
FIG. 4 depicts a simplified AFG inclinometer illustrating an angular inclination measurement based on movement of a conductive liquid droplet in a sealed microchannel under the influence of gravity according to an example embodiment.

FIG. 4 is a simplified rendition of an AFG inclinometer 400 illustrating an angular inclination measurement based on movement of a conductive liquid droplet in a sealed microchannel under the influence of gravity according to an example embodiment. As will be seen below, whereas an inclinometer comprising a plurality of AFG sensor ports disposed in a microchannel is fabricated as a planar device in a suitable semiconductor material, it may be oriented in a measurement apparatus or device such that when the apparatus is placed or positioned on a surface for measurement, the conductive liquid droplet in the inclinometer's sealed microchannel experiences a vertical gravitational force. Accordingly, when the inclinometer is placed on a flat surface, the position of the conductive liquid droplet in the sealed microchannel is indicative of 0 degrees of inclination (i.e., the "zero angle" position, also referred to as initial vertical reference line or initial plumb line). If a measurement surface has a slope, either negative or positive, the conductive liquid droplet moves within the sealed microchannel along its curvature either to the left or the right of the zero angle position under the gravitational force to define a new plumb line, whose deflection from the initial vertical reference is a measurement of the angular inclination of the surface. Assuming a simple circular geometry for the sealed microchannel (e.g., the sealed microchannel is a portion of a circle), it is known that an angle ($\theta$) subtended by an arc length (s) of a circular arc is related to the radius (r) of the circle. More particularly, the length of an arc is equal to the radius multiplied by the magnitude of the subtended angle in radians, which can be converted into degrees given that 1 radian=$180/\pi$ degrees. Accordingly, for a sealed microchannel having the shape of an arcuate portion that forms part of a circle with certain diameter, a number of sensor access ports may be provided on either side of the zero angle vertical reference line, which in a symmetrical arrangement is exactly at the mid point of the length of the arcuate portion. For an inclinometer to have a range of ±45 degrees, the sealed microchannel must therefore comprise a quarter circle that subtends to 90 degrees or $\pi/2$ radians. Likewise, for an inclinometer to have a range of ±90 degrees, the sealed microchannel needs to be at least half a circle which "subtends" to 180 degrees or $\pi$ radians.

Still continuing with a circular geometry embodiment by way of illustration, angular measurement resolution may be defined as R={Maximum measurement range of angular inclination}/(N−1), where N=the number of sensor access ports provided in a sealed microchannel. For example, if the sealed microchannel comprises a semicircle for measuring ±90 degrees of angular inclination, 181 sensor access ports or electrodes are needed to achieve an angular inclination resolution of 1 degree, which may be spaced apart along the length of the sealed microchannel at a specific arc length that subtends to 1 degree. To obtain a half a degree of angular resolution, an example semicircular microchannel will therefore require 361 sensor access ports that are spaced apart along the length of the microchannel at a specific arc length that subtends to half a degree.

One skilled in the art will recognize that the length of a curvilinear, arcuate microchannel may accordingly be calibrated during fabrication based on the number of sensor access ports used for an inclinometer in conjunction with the size and shape of the specific microchannel being fabricated. Furthermore, although various examples of specific circular geometries have been illustrated herein, similar calibration methodologies may also be applied, mutatis mutandis, where non-circular microchannels, tubes, trenches, etc. having different curvatures are implemented (e.g., parabolic or ellipsoidal arcs, smoothly differentiable curves, and the like).

Turning to the example inclinometer embodiment 400 of FIG. 4, a semicircular microchannel 404 is illustrated with a plurality of sensor access port electrodes 406-1 to 406-12 and corresponding plurality of reference electrodes 408-1 to 408-12. Given that there are 12 electrode pairs, the angular resolution of this embodiment is 16.363°, wherein the 12 electrode pairs are spaced apart at an arc length 407 that subtends to 16.363° for a given radius of the microchannel 404. Initially, on a flat surface, conductive liquid droplet 410 contained within the microchannel 404 is at a 0° position that defines an initial vertical reference line 415. As the inclinometer 400 is placed on a tilted surface 419 that is at an angle with respect to a flat surface or horizon 420, conductive liquid droplet 410 is moved to a new position that is 3 arc lengths away from the zero angle position, defining a new plumb line 416. Because of the conductive path created between the sensor access port electrode 406-9 and associated reference electrode 408-9, a discharge is detected by the control circuitry associated with the AFG device coupled to the electrodes 406-9, 408-9, which may be correlated as an angular inclination of 49.09° (e.g., by way of a lookup table, for instance), that may be read out as output via a suitable display or other user interface. Further, the subtended angle φ between the initial vertical reference line 415 and the new vertical reference line 416 is also the angular inclination φ between the tilted surface 419 and horizon 420 because of the straightforward Euclidian planar geometry involving the congruent angles caused by the intersection of the tilted surface line 419 and a reference parallel line 418 by the transversal vertical line 416.

Figure 5:
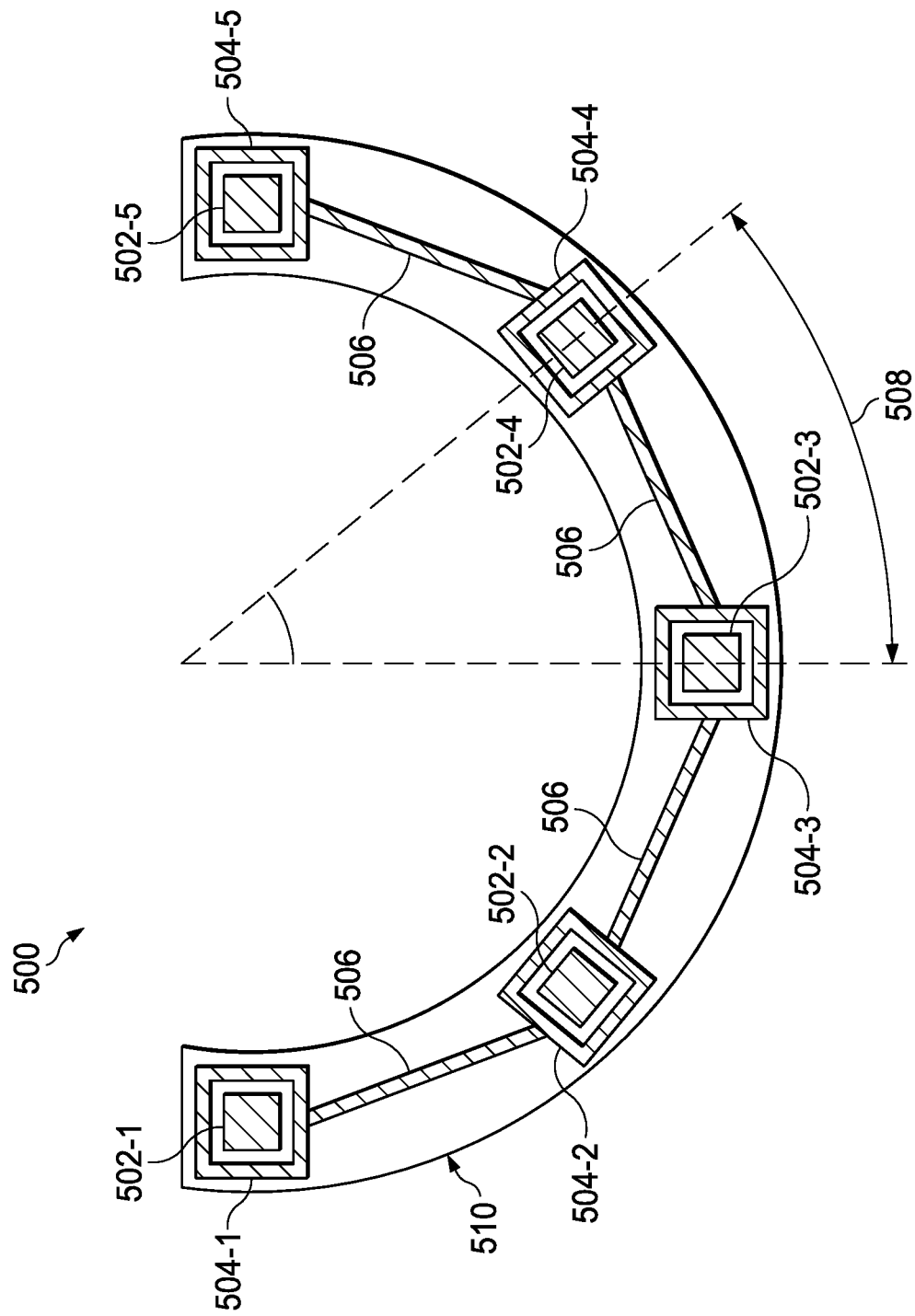
FIG. 5 depicts a simplified AFG inclinometer illustrating additional or alternative arrangements of sensor ports in a sealed microchannel.

Although the plurality of sensor access port electrodes and corresponding reference electrodes have been illustrated in the example inclinometer embodiments of FIGS. 1 and 4 as square pads are placed in each other's pair-wise proximity within the sealed microchannel, one skilled in the art will recognize that several variations are possible within the scope of the present invention, as will be seen in reference to one or more additional or alternative embodiments set forth in detail below. By way of example, FIG. 5 depicts another simplified AFG inclinometer 500 illustrating an arrangement wherein five sensor port electrodes 502-1 to 502-5 disposed in sealed microchannel 510 are placed at a calibrated arc length 508 that subtends a 45° angle. Each sensor port electrode 502-1 to 502-5 is surrounded by a reference electrode ring or square band 504-1 to 504-5 that is separated by a select distance. Further, additionally or optionally, the reference electrode rings 504-1 to 504-5 may be electrically tied together, e.g., by way of electrical connectors 506 that couple each reference electrode to its adjacent reference electrode, thereby resulting in a continuous reference band, strip or ground ring disposed within the microchannel 510 in an example implementation. Skilled artisans will further recognize that a reference electrode does not have to be in any particular shape or size so long as a conductive droplet provided within the sealed microchannel of an inclinometer covers the separation distance between an access port electrode and its corresponding reference electrode such that the charge on the AFG sensor's floating-gate is discharged during inclination measurement operations.

Figure 6:
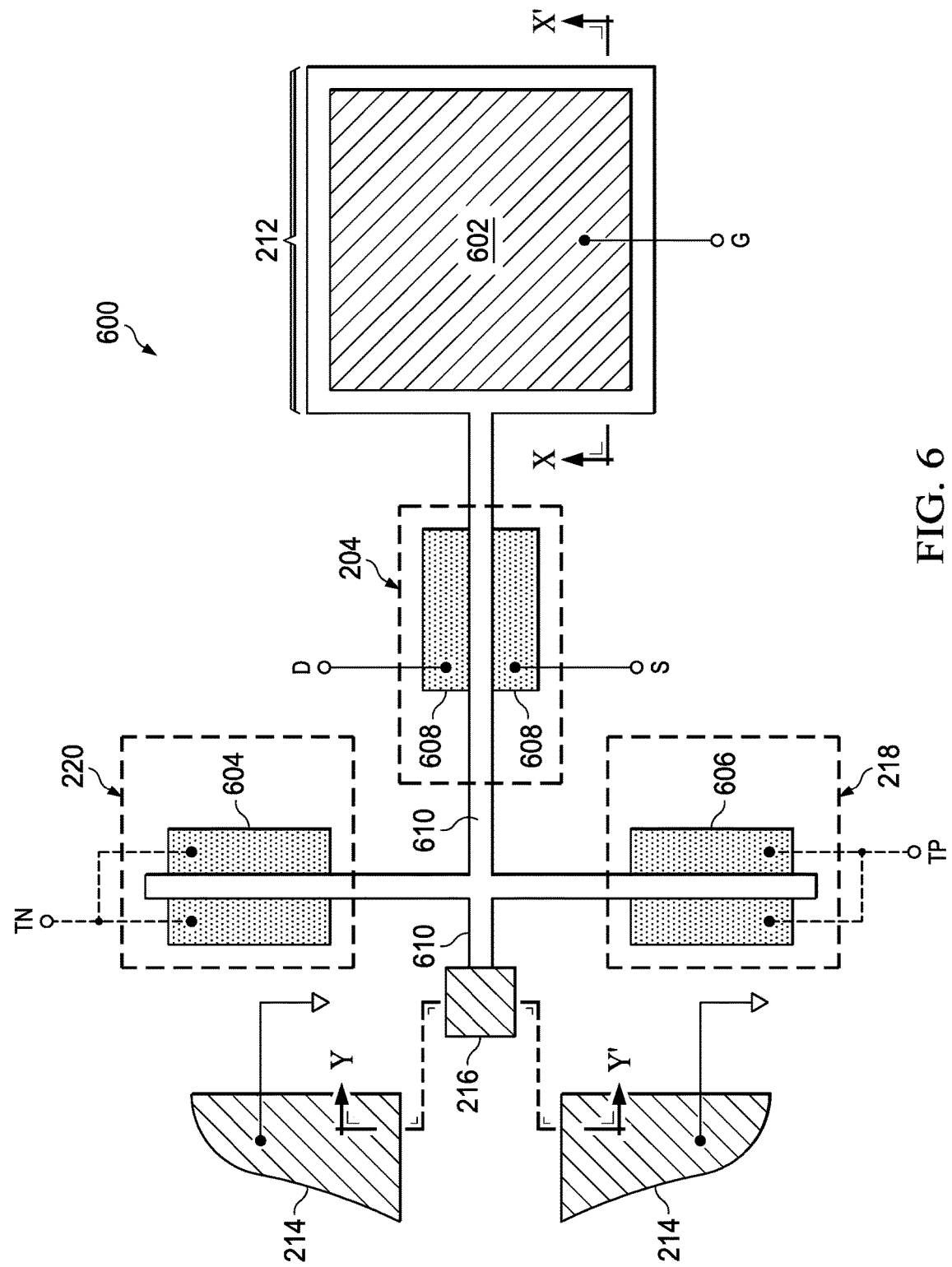
FIG. 6 depicts an example layout diagram of an AFG integrated circuit corresponding to an embodiment shown in FIG. 2.

FIG. 6 depicts is an example layout diagram of an AFG integrated circuit corresponding to an embodiment shown in FIG. 2. As one skilled in the art will recognize, the layout 600 shown in FIG. 6 is an illustrative example layout that may be implemented using a number of fabrication technologies and line widths for the construction of an analog floating-gate structure such as may be used to implement the circuit of FIG. 2. It is therefore contemplated that the example floating-gate structure may be fabricated by way of known or heretofore unknown manufacturing technology, extending into or including sub-micron fabrication processes. It is further contemplated that those skilled in the art having reference to this specification will be readily able to adapt an example AFG integrated circuit design set forth herein in the desired manufacturing technology, without undue experimentation.

Figure 7:
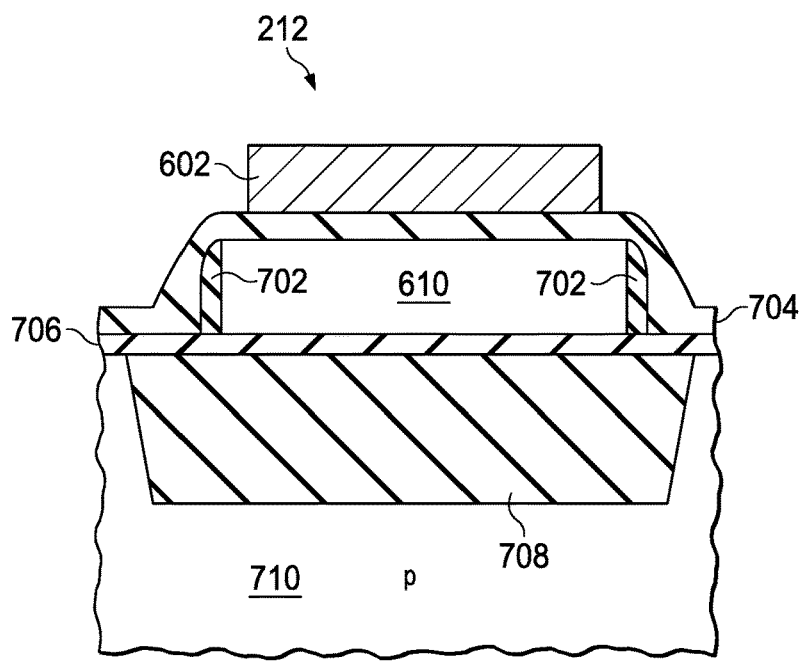
FIG. 7 depicts a cross-sectional view of a portion of the layout of shown in FIG. 6.

As shown in FIG. 6, a floating-gate electrode may be constructed as a polycrystalline silicon (polysilicon) element 610 having a specific geometry, which may extend over the surface of a semiconductor wafer (or over a semiconductor surface layer, in the silicon-on-insulator (SOI) context) in forming multiple devices or components. Polysilicon element 610 is typically doped to a desired conductivity type and concentration, to be conductive to the desired extent; for example, by way of n-type doping for an example n-channel MOS transistor 204. In an example implementation, polysilicon element 610 may be provided with a widened portion at one of its ends that is operative to serve as a lower plate of storage capacitor 212. Apart from forming the capacitor's lower plate, polysilicon element 610 may be designed as a narrower strip, for example, at a minimum feature size without violating the design rules or critical dimensions for the manufacturing technology implemented in an example process. The cross-section of storage capacitor 212 along X-X' illustrated in FIG. 7 shows the lower plate portion of polysilicon element 610 as overlying a trench isolation dielectric structure 708. A gate dielectric layer 706, e.g., formed of deposited or thermal silicon dioxide, is disposed between the surface of isolation dielectric structure 708 and polysilicon element 610, which will also underlie polysilicon element 610 at those locations where it overlies active regions (i.e., at transistor 204 and tunnel capacitors 218, 220). A sidewall oxide 702 may also be provided along the vertical sidewalls of polysilicon element 610. In the example embodiment shown, the surface into which isolation dielectric structure 708 is formed is the top surface of p-type silicon substrate 710 (for n-channel AFG devices). An upper plate 602 of storage capacitor 212 may be formed of a metal such as tantalum nitride (TaN), and overlies the widened portion of polysilicon element 610 at this location. In this embodiment of the invention, capacitor dielectric 704 shielding the floating gate 610 may be formed of one or more dielectric layers, e.g., silicon nitride, silicon dioxide, or a combination of these or other dielectric materials.

Continuing to refer to FIG. 6, transistor 204 and tunnel capacitors 218, 220 may be constructed along those portions of polysilicon element 610 that overlie active regions (i.e., that do not overlie isolation dielectric structures 708). In particular, MOS transistor 204 may be defined at that portion of polysilicon element 610 overlying an active region of p-type substrate 710, with gate dielectric 706 disposed between polysilicon element 610 and that active region. The source and drain of transistor 204 may be formed as heavily-doped n-type source/drain regions 608 implanted and diffused into the p-type active region on opposite sides of polysilicon element 610, e.g., in a conventional self-aligned fabrication process. Topside contacts from an overlying metal conductor, and corresponding to terminals D, S as in the circuit of FIG. 2, may be made through an interlevel dielectric layer to source/drain regions 608.

Tunnel capacitors 218, 220 may be constructed in the conventional manner for floating-gate devices. In one example embodiment, tunnel capacitor 220 may be constructed essentially similarly as n-channel MOS transistor 204, but where polysilicon element 610 overlies an instance of an isolated p-type well, e.g., a p-well isolated from the underlying substrate by a buried n-type layer and an n-well ring. Gate dielectric layer 706 is formed between polysilicon element 610 and the surface of the p-well to serve as the capacitor dielectric layer. Heavily-doped n-type source/drain regions 604 may be formed into the isolated p-well in a self-aligned manner. Terminal TN may be connected via a contact to the isolated p-well in which these source/drain regions 604 are formed, such that the resultant semiconductor structure operates as a capacitor rather than a transistor, but with source/drain regions 604 serving as sources of electrons when a negative bias is applied to terminal TN. Likewise, tunnel capacitor 218 may be constructed essentially similarly as tunnel capacitor 220, but at a location at which polysilicon element 610 overlies gate dielectric layer 706 at the surface of an n-well formed into substrate 710. Terminal TP is connected to this n-well by a contact structure (not specifically shown in the layout 600), and p-type source/drain regions 606 that are formed on either side of polysilicon element 610 act as a sources of holes when a positive bias is applied to terminal TP. Skilled artisans should appreciate that tunnel capacitors 218, 220 may be constructed according to such other arrangements as suitable for particular implementations and manufacturing technologies.

In the example layout embodiment 600 shown in FIG. 6, the difference in relative area between tunneling capacitors 218, 220, on one hand, and storage capacitor 212, on the other hand, along with any differences in the capacitor dielectric materials and thicknesses, will be reflected in the relative capacitances between these elements. Because the capacitance of storage capacitor 212 is substantially larger than the capacitances of tunnel capacitors 218, 220 (and also the parasitic capacitances of transistor 204), tunneling of electrons can be achieved at reasonable bias voltages to avoid damage or breakdown. This disparity in capacitive coupling is contemplated to provide excellent (re)programming (i.e., (re)charging) and erase performance for the plurality of AFG devices provided in an example inclinometer implementation according to the teachings of the present invention.

Many variations in the electrical and physical construction of an AFG circuit, relative to that described above, are contemplated. From an electrical standpoint, an example variation may include circuits such as a reference circuit arranged as a dual floating-gate differential amplifier circuit, as known in the art. As mentioned above, examples of other analog floating-gate circuits include analog memory devices, and digital electrically programmable memory cells (including cells that may be set into one of more than two possible states, reflecting a multiple-bit data value). From a construction standpoint, such variations include other arrangements of the floating-gate device, including polysilicon-to-polysilicon floating-gate capacitors, polysilicon-to-active capacitors, and the like, and including floating-gate devices that are programmable by other mechanisms besides Fowler-Nordheim tunneling. It is contemplated that those skilled in the art having reference to this specification will be readily able to realize these, and other, variations as appropriate for particular circuit applications, without undue experimentation.

Figure 8A:
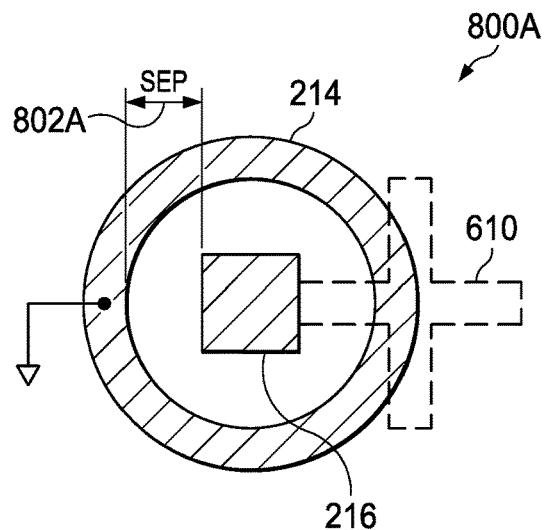
FIGS. 8A-8C depict example layout arrangements of conductors of an AFG integrated circuit for sensing the presence of a conductive liquid droplet arranged to move freely in a sealed microchannel.
Figure 8B:
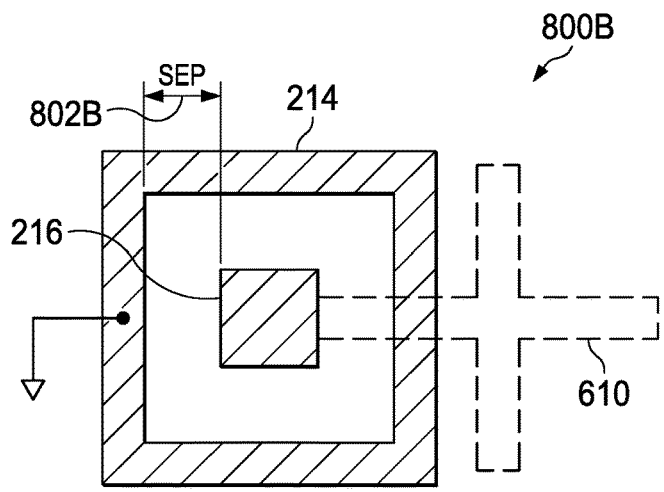
Figure 8C:
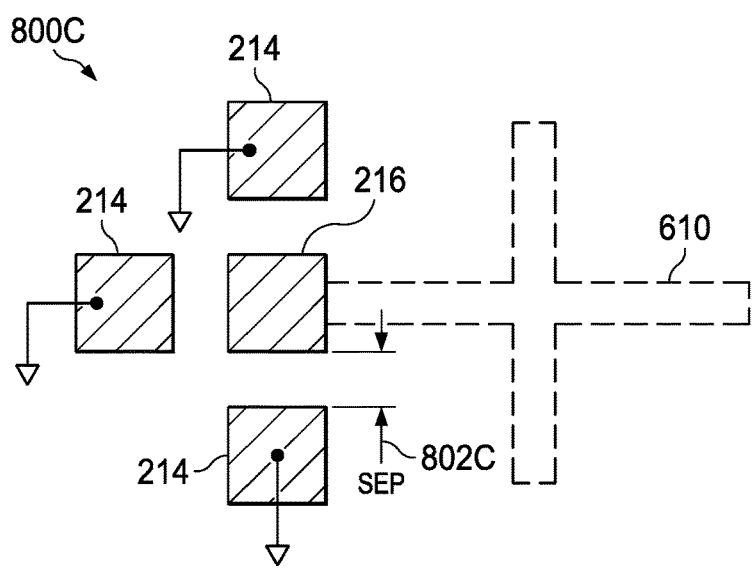
Figure 9:
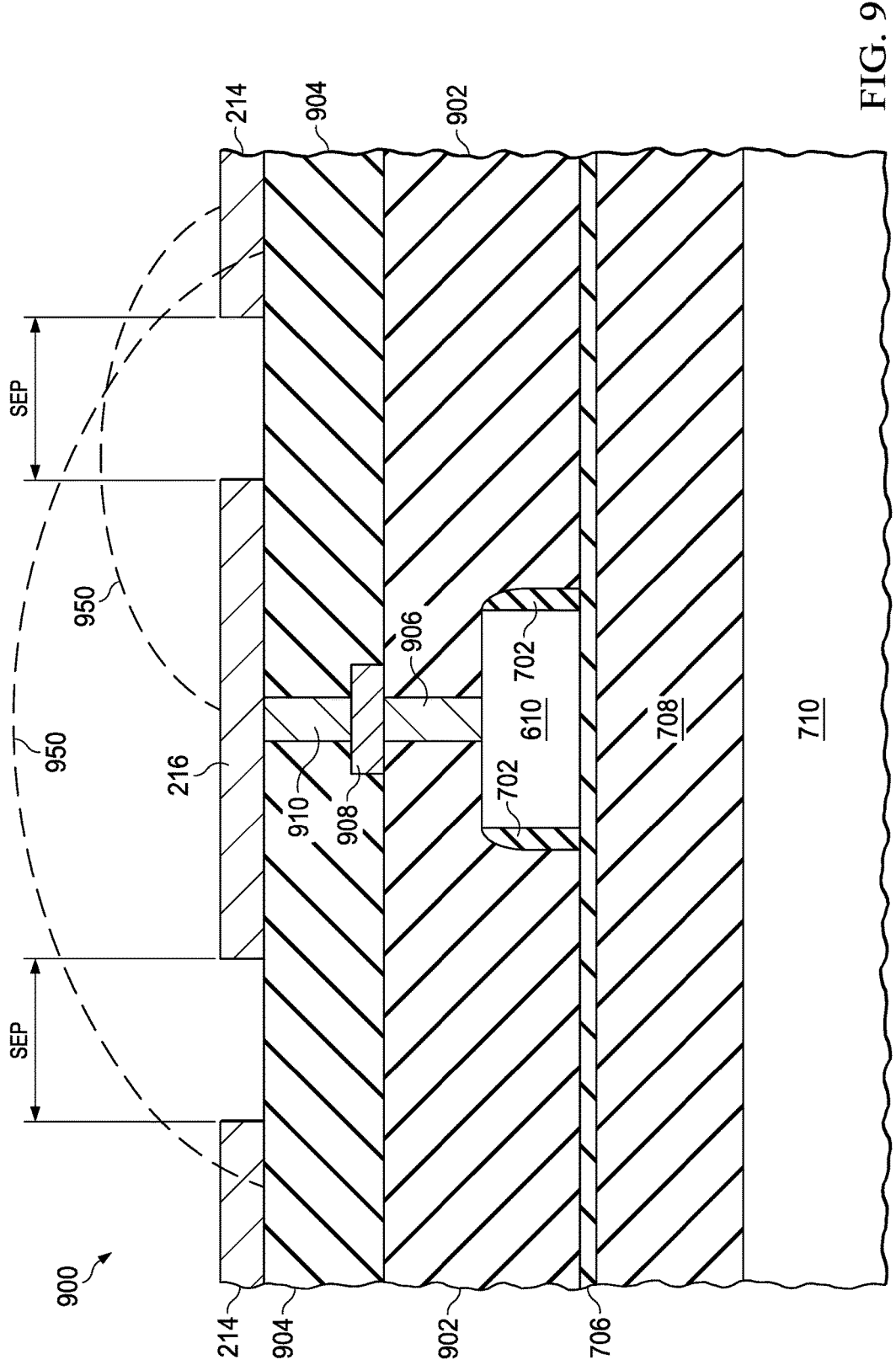
FIG. 9 depicts a cross-sectional view of a portion of the layout of shown in FIG. 6.

FIGS. 8A-8C depict example layout arrangements of conductors of an AFG integrated circuit for sensing the presence of a conductive liquid droplet arranged to move freely in a sealed microchannel under gravity. FIG. 9 depicts a cross-sectional view of a portion of the layout of shown in FIG. 6 in additional detail. Cumulatively referencing these Figures in conjunction with FIGS. 6 and 7 described above, conductor element 216 may formed as a metal pad at the surface of integrated circuit 202 to be in electrical contact with polysilicon element 610 (i.e., floating-gate electrode 210 in FIG. 2). In the conductor embodiment 800A of FIG. 8A, reference conductor element 214 may be formed as a concentric ring around the conductor 216 with a specific separation or distance 802A. In the conductor embodiment 800B of FIG. 8B, reference conductor element 214 may be of a different geometry (e.g., a square) that surrounds the conductor element 216, but spaced apart therefrom with a suitable separation 802B. In a still further example embodiment 800C of FIG. 8C, one or more reference conductor elements 214 may be provided that are positioned in a proximity 802C of the conductor element 216 coupled to the polysilicon floating gate 610. In yet another arrangement, the reference conductor elements 214 of multiple AFG sensor devices may be commonly or electrically connected together to form a reference ring, band or strip or similar structure along the curvature of a sealed microchannel of an example inclinometer of the present invention, as previously noted. One skilled in the art will readily recognize that several other variations, modifications and arrangements may be provided with respect to the conductor elements of AFG sensor devices in an inclinometer implementation so long as the conductive droplet sizing is compatible for providing a conductive path as described hereinabove.

A conductor arrangement similar to the arrangements of FIG. 8A or FIG. B is particularly illustrated in the cross-sectional view 900 of FIG. 9, wherein a cross-section taken at Y-Y' of the layout 600 is exemplified. In this example, first interlevel insulator 902 overlies polysilicon element 610, with a first conductive plug 906 disposed in a via in the insulator 902 and in contact with polysilicon element 710 as shown. A conductive pad 908, formed of a metal (i.e., a first metal level) or another conductor material, is disposed at the surface of first interlevel insulator 902 and in contact with plug 906. Similarly, a second interlevel insulator layer 904 overlies first interlevel insulator 902, with a second conductive plug 910 formed in a via through layer 904 to contact conductive pad 908. Conductor element 216 in this example is formed at the surface of second interlevel insulator 904, at a location overlying and in contact with conductive plug 910. As such, conductor element 216 is in electrical contact with polysilicon element 610 (which forms floating-gate electrode 210 in FIG. 2), by the series connections of plugs 910, 908 and pad 906. While plugs 906, 910 and pad 908 are all illustrated as directly overlying one another in the example cross-sectional view 900 of FIG. 9, it is also contemplated that plugs 906, 910 may be laterally separated from one another (i.e., contacting conductive pad 908 at different locations along its length) if desired. In addition, while the example embodiment of FIG. 9 shows a single metal level (pad 908) disposed between conductive element 216 and polysilicon 610, it should be apparent that two or more metal levels may be included in the various layers therebetween, as known in the art. In any event, according to these embodiments, conductive element 216 is provided at the surface of the AFG sensor circuit, either above the top insulator layer (layer 904 in the example of FIG. 9), or alternatively exposed through an opening in a protective overcoat or other overlying insulator layer.

As noted above, one or more reference conductive elements 214 may also be provided at the surface of the AFG sensor circuit, which may be comprise one or more metal features formed in the same conductive layer as conductive element 216, and near to but spaced apart from conductive element 216. In one example embodiment, reference conductive elements 214 may be provided in the form of metal pads that are significantly larger in area than conductive element 216. Further, it is contemplated that such multiple metal pads may be arranged to surround conductive element 214, similar to one or more example conductor arrangements described above so as to be capable of being covered or interposed by a droplet 950, illustratively shown in two interposed arrangements in FIG. 9. In any case, reference conductive element(s) 214 are each separated from sense conductive element 216 by a particular distance or separation 802A-C as previously set forth, and as such are not in direct electrical contact with conductive element 214 (nor in contact with any other node of the analog floating-gate circuit, for that matter, in an example implementation). It is contemplated that one or more reference conductive elements 214 that surround conductive element 216 on all sides may be designed to provide repeatable and consistent measurement results. Each reference conductive element 214 is preferably in contact with a conductor or a semiconductor region that will, in operation, be at a reference voltage such as ground. Further, as in the case of conductive element 216, each reference conductive element 214 may be exposed at the surface of the AFG sensor circuit, either above the top insulator layer (layer 904) in the example embodiment of FIG. 9), or alternatively exposed through an opening in a protective overcoat or other overlying insulator layer.

Figure 10B:
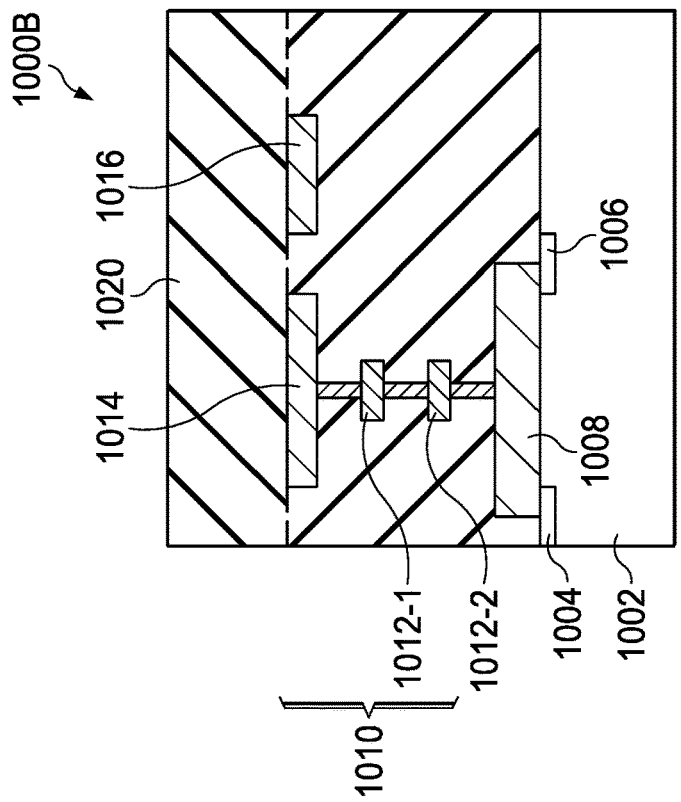
FIGS. 10A-10I depict several cross-sectional views illustrative of an example process flow for fabricating an AFG inclinometer according to an embodiment of the present invention.
Figure 10A:
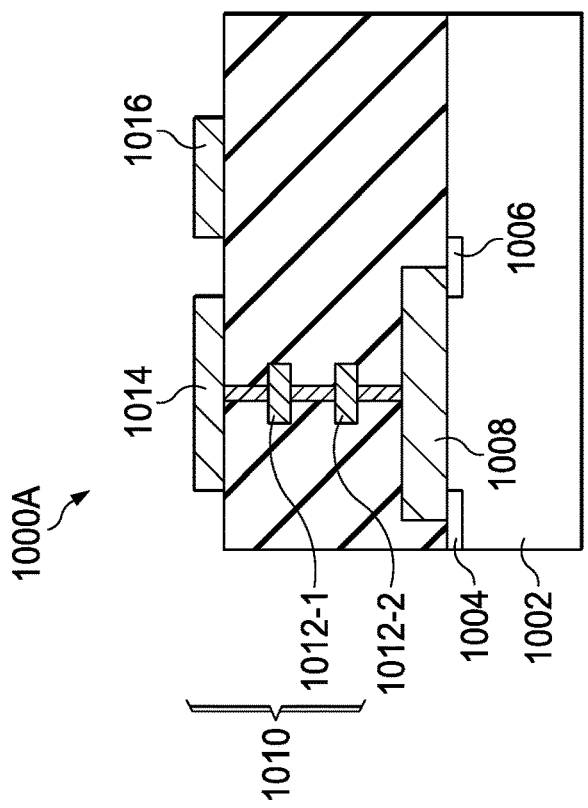
Figures 10C, 10D:
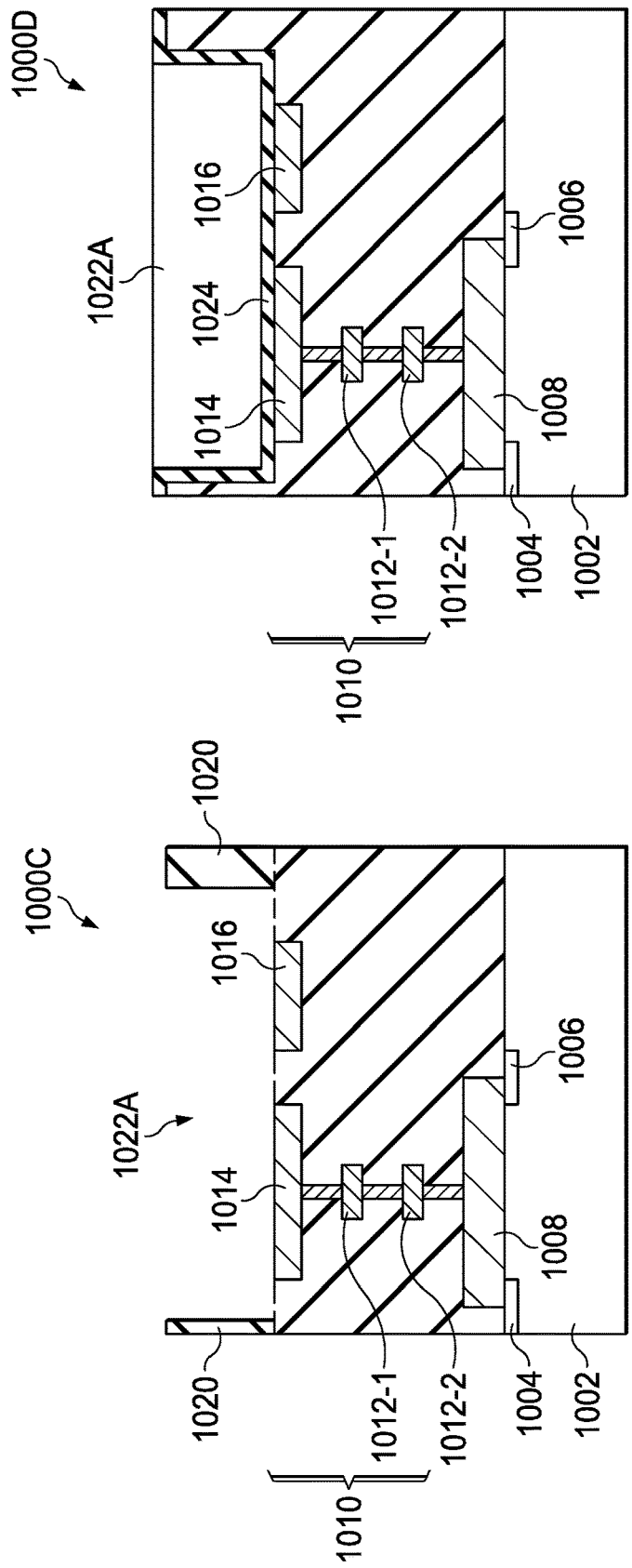
Figure 10F:
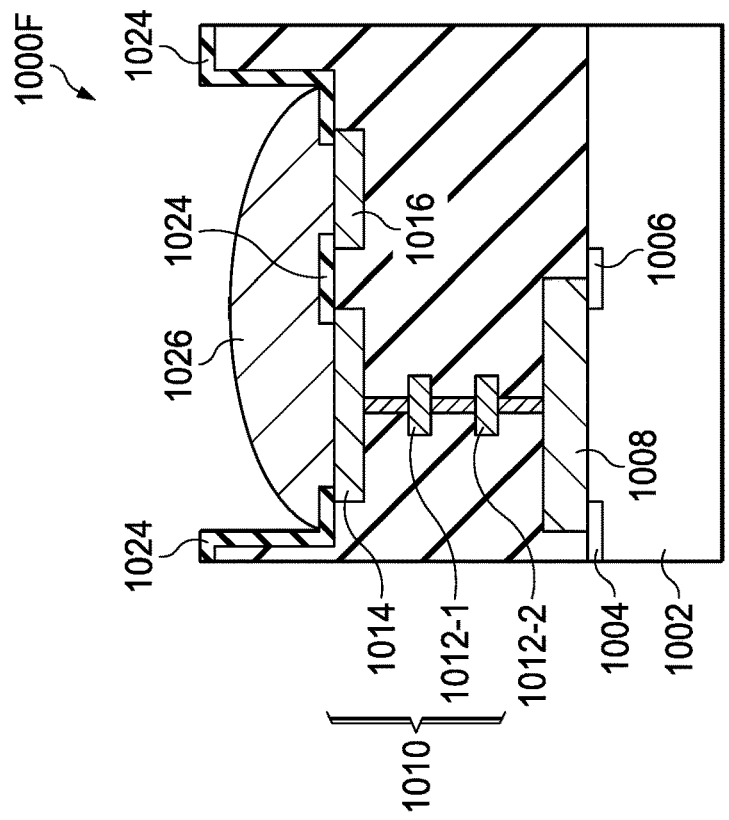
Figure 10E:
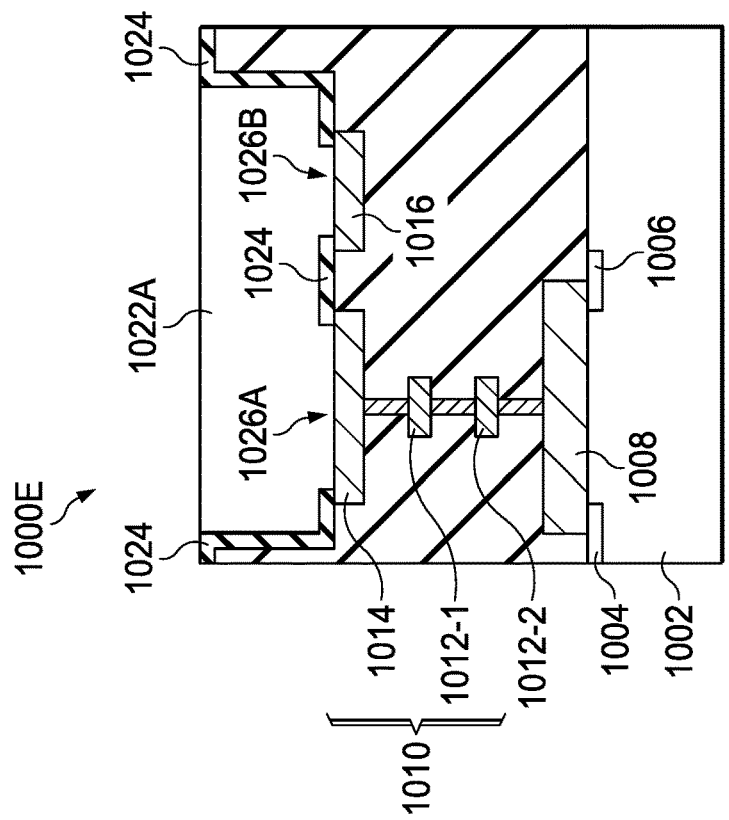
Figure 10H:
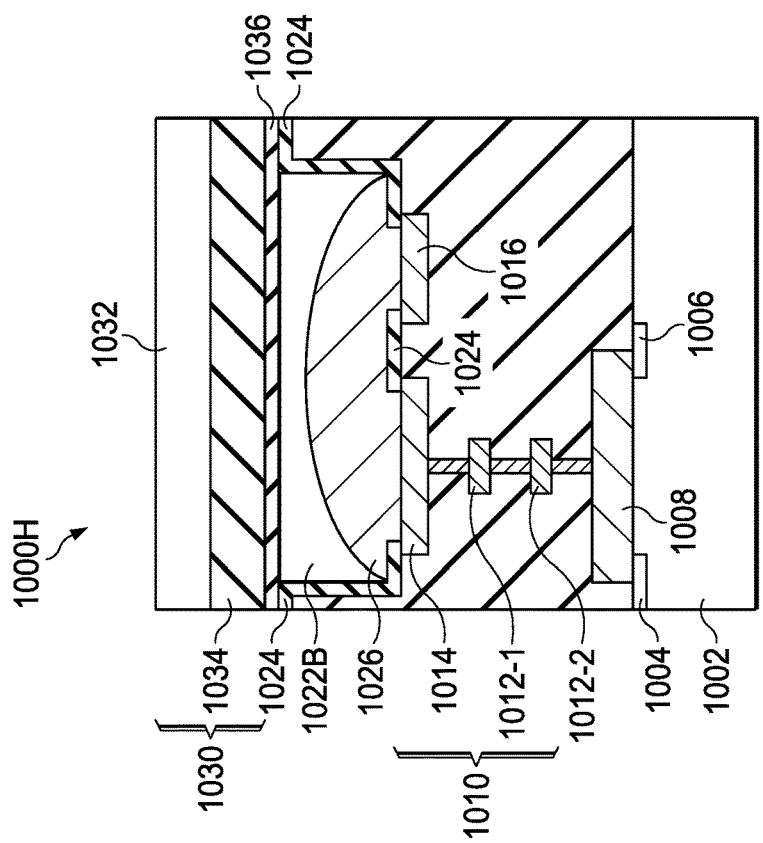
Figure 10G:
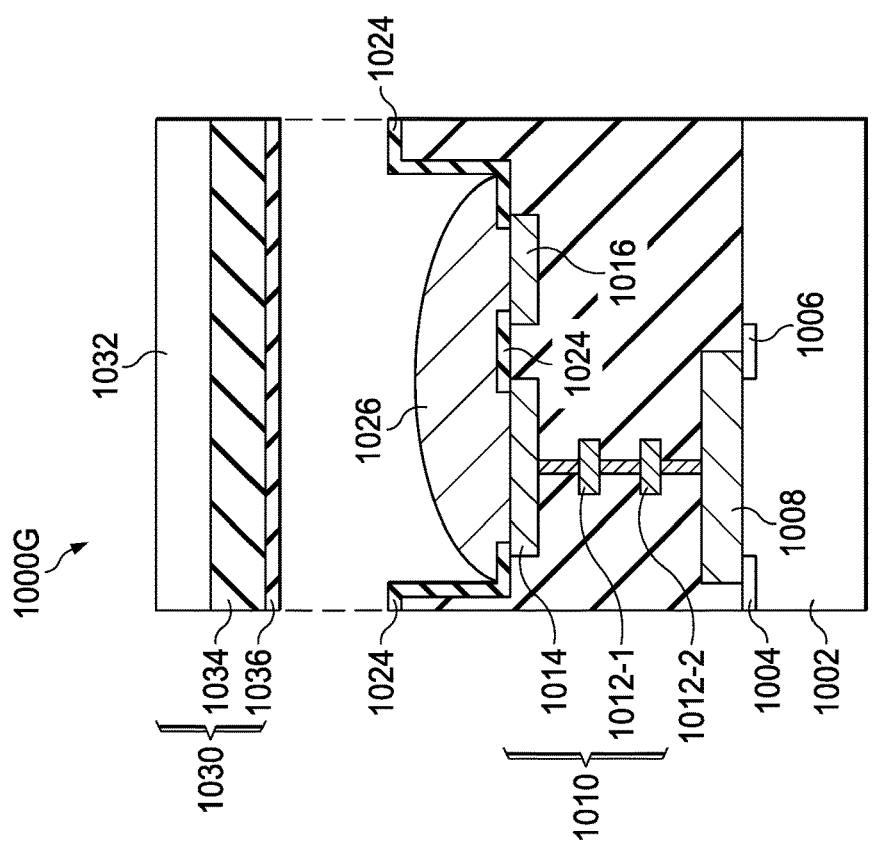
Figure 10I:
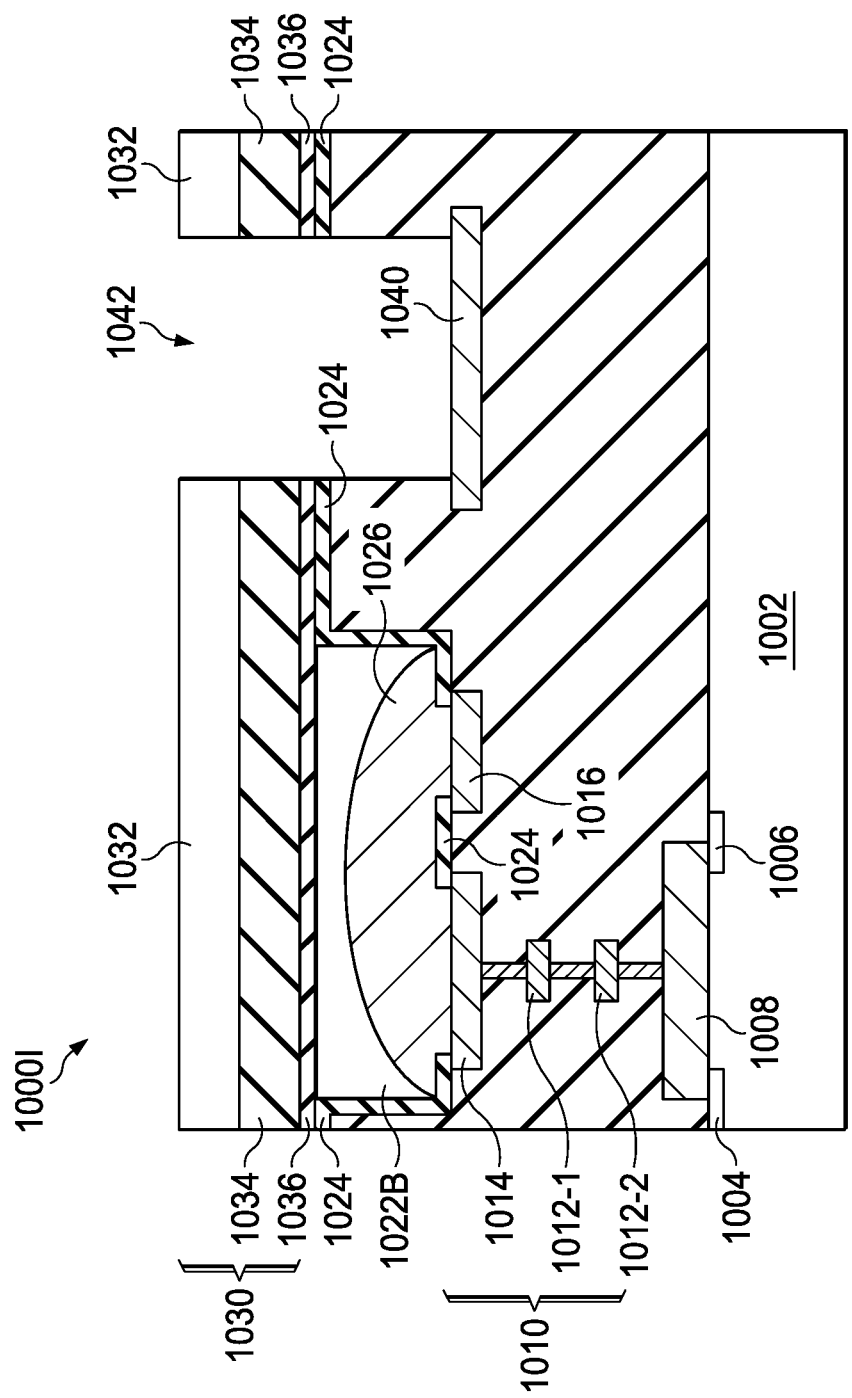

FIGS. 10A-10I depict cross-sectional views illustrative of an example process flow for fabricating an AFG inclinometer after the formation of AFG sensor circuits according to an embodiment of the present invention. FIG. 10A shows a fabrication stage 1000A with respect to a semiconductor wafer that has been processed through appropriate flows, e.g., as set forth above, to result in the formation of multiple AFG sensors per die (i.e., per inclinometer device), each comprising topside conductor elements 1014, 1016, one or more metal levels or layers 1012-1, 1012-2 underlying the conductor elements, and associated floating-gate electrode 1008 formed over a suitable substrate 1002 having source/drain regions 1004/1006 defined therein. One skilled in the art will recognize that the exact number and spatial arrangement of the AFG sensors is dependent on various design factors such as the range of angular inclination that an inclinometer device can measure (e.g., ±45 degrees, ±60 degrees, ±90 degrees, etc.), resolution of angular inclination measurements (i.e., the smallest amount of angular inclination that can be reliably measured), size/shape of the microchannel to be formed, conductive droplet sizing, and the like, as previously noted. For example, if an inclinometer having ±90 degree range is desired at 1 degree resolution, 181 AFG sensor circuits will be required, which need to be placed along the calibrated curvature of a semicircular microchannel at appropriate arc lengths as described hereinabove.

To form a microchannel, a dielectric layer 1020 of suitable thickness, e.g., silicon dioxide, is deposited over the conductor elements 1014, 1016, as shown in fabrication stage 1010B, wherein conductor element 1014 operative as an access port electrode is electrically coupled or connected to the floating gate 1008 while conductor element 1016 is provided as a reference electrode associated therewith. Fabrication stage 1000C illustrates an etching process wherein an open microchannel or trench 1022A is created in the dielectric layer 1020. A silicon nitride liner 1024 is then deposited in the open microchannel 1022A to line the bottom and sidewalls of the open microchannel 1022A, as shown in fabrication stage 1000D. In fabrication stage 1000E, a nitride etch process is performed in order to create openings 1026A, 1026B over the conductors 1014 and 1016, respectively. A single conductive droplet or micro-drop 1026 of suitable dimensions (e.g., from 1 micron to several microns) is deposited into the open microchannel 1022A, using a number of microdispensing techniques, e.g., ink jet deposition, microsyringe deposition, etc. As illustrated in fabrication stage 1000F of FIG. 10F, the droplet 1026 is preferably sized to cover the separation between conductor elements 1014 and 1016 when settled at a particular AFG access port. A cap structure 1030, which in one example embodiment may comprise a previously formed wafer of silicon substrate 1032, silicon dioxide 1034, and silicon nitride 1036, is inverted and positioned over the wafer with the AFG circuitry (also referred to as the sensor wafer), as shown in fabrication stage 1000G. In one embodiment, the silicon substrate 1032 of cap wafer structure 1030 may be thinned to a suitable thickness, with oxide and nitride layers 1034, 1036 having appropriate thicknesses formed thereon.

In fabrication stage 1000H, the inverted cap wafer structure 1030 is brought into contact with the sensor wafer and bonded to it so as to create a sealed microchannel 1022B containing conductive droplet 1026 therein. Openings 1042 over bond pads 1040 provided at appropriate places in the AFG inclinometer device (e.g., formed during one or more of the metallization stages) may be created in the cap wafer 1030 and through the top dielectric layer by an etching process, as illustrated in fabrication stage 1000I of FIG. 10I.

Approximate dimensions for a circle-based microchannel could be a diameter of several hundred microns and widths of up to several microns, depending on resolution and/or size of the conductive droplet. Because droplet sizes as low as 1 μm are possible, various microchannel geometries may be implemented in practicing an embodiment of the present invention. By way of illustration, an example microchannel could comprise a diameter of 500 to 1800 μm and a width ranging e.g., from 2 to 25 μm for a 1-degree resolution and assuming the droplet only covers one sensor port at a time. Of course, the diameter could be made smaller and the ports moved closer together by determining the width of the droplet during calibration/reset and using that width in subsequent calculations/calibrations to determine the slope.

Figures 11A, 11B:
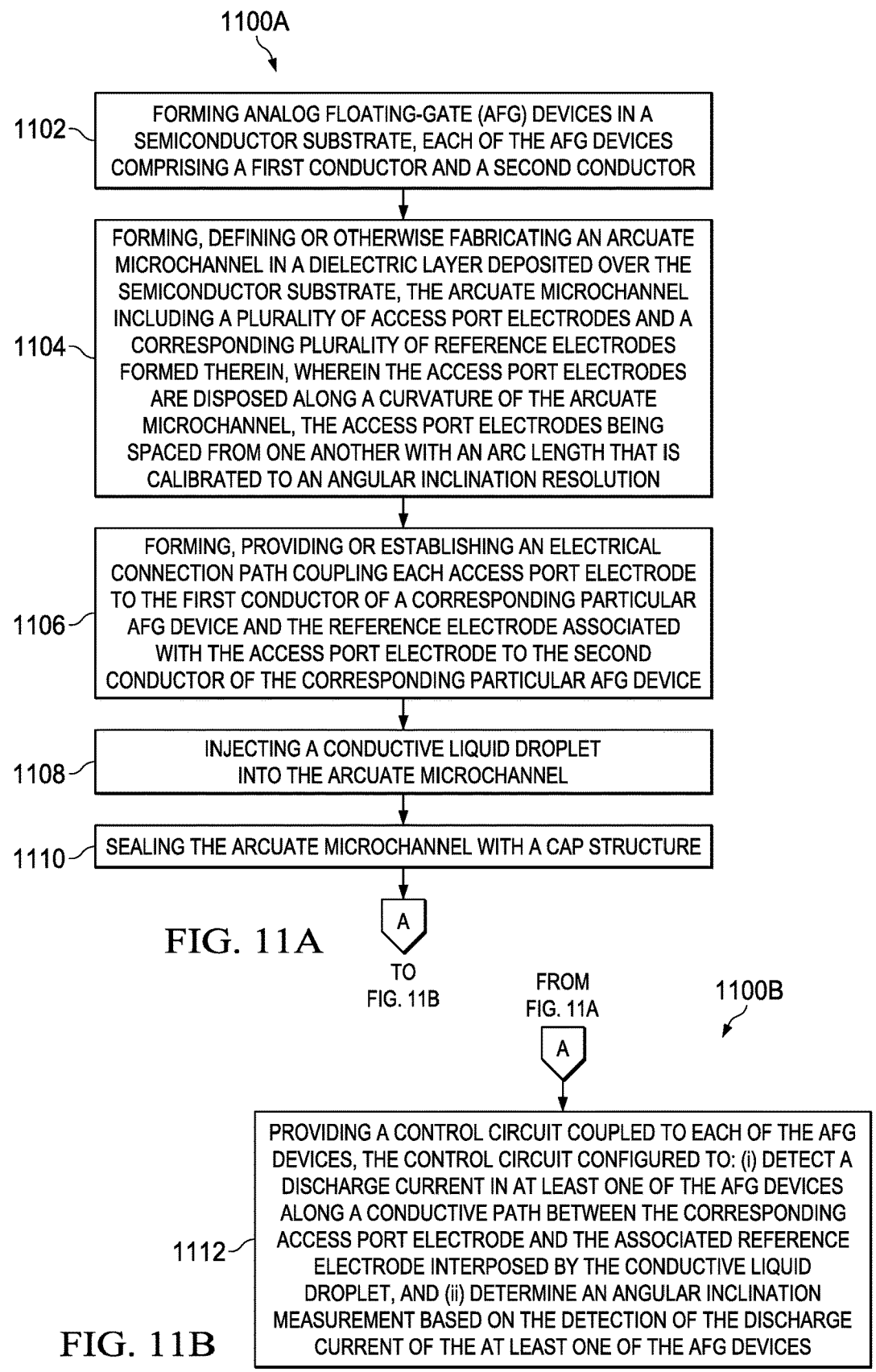
FIGS. 11A and 11B are flowcharts of an example method for fabricating an AFG inclinometer according to an embodiment of the present invention.

FIGS. 11A and 11B are flowcharts of an example overall process flow or method 1100A/B for fabricating an AFG inclinometer according to an embodiment of the present invention. At block 1102, a plurality of AFG sensor devices in a semiconductor substrate may be formed, wherein each AFG device comprises a first conductor and a second conductor. A microchannel having a suitable geometry (e.g., arcuate or curvilinear shape) is formed or otherwise defined in a dielectric layer deposited over the semiconductor substrate (block 1104), wherein the arcuate microchannel includes a plurality of access port electrodes and a corresponding plurality of reference electrodes formed therein. As noted above, the access port electrodes are disposed along a curvature of the arcuate microchannel, the access port electrodes being spaced from one another with an arc length that is calibrated to an angular inclination resolution. In one example implementation, the microchannel may be formed directly over the AFG sensor devices as described hereinabove, whereby the first and second conductor elements of the AFG sensor devices are respectively operative as access port electrodes and associated reference electrodes. In an alternative or additional arrangement, respective electrical connection paths may be provided for coupling each access port electrode to the first conductor of a corresponding particular AFG device and the reference electrode associated with the access port electrode to the second conductor of the corresponding particular AFG device, as set forth at block 1106. At block 1108, a conductive liquid droplet is deposited, injected, or otherwise introduced into the arcuate microchannel, which is then sealed with a cap structure (block 1110). As noted previously, the conductive liquid droplet may be dimensioned to move freely within the sealed arcuate microchannel under gravity, e.g., when placed in a vertical orientation, placed on an incline surface, and the like. An example flow 11006 may further include providing a control circuit coupled to each of the AFG devices, the control circuit configured to, inter alia: (i) detect a discharge current in at least one of the AFG devices along a conductive path between the corresponding access port electrode and the associated reference electrode interposed by the conductive liquid droplet, and (ii) determine an angular inclination measurement based on the detection of the discharge current of the at least one of the AFG devices, as set forth at block 1112.

Figure 12:
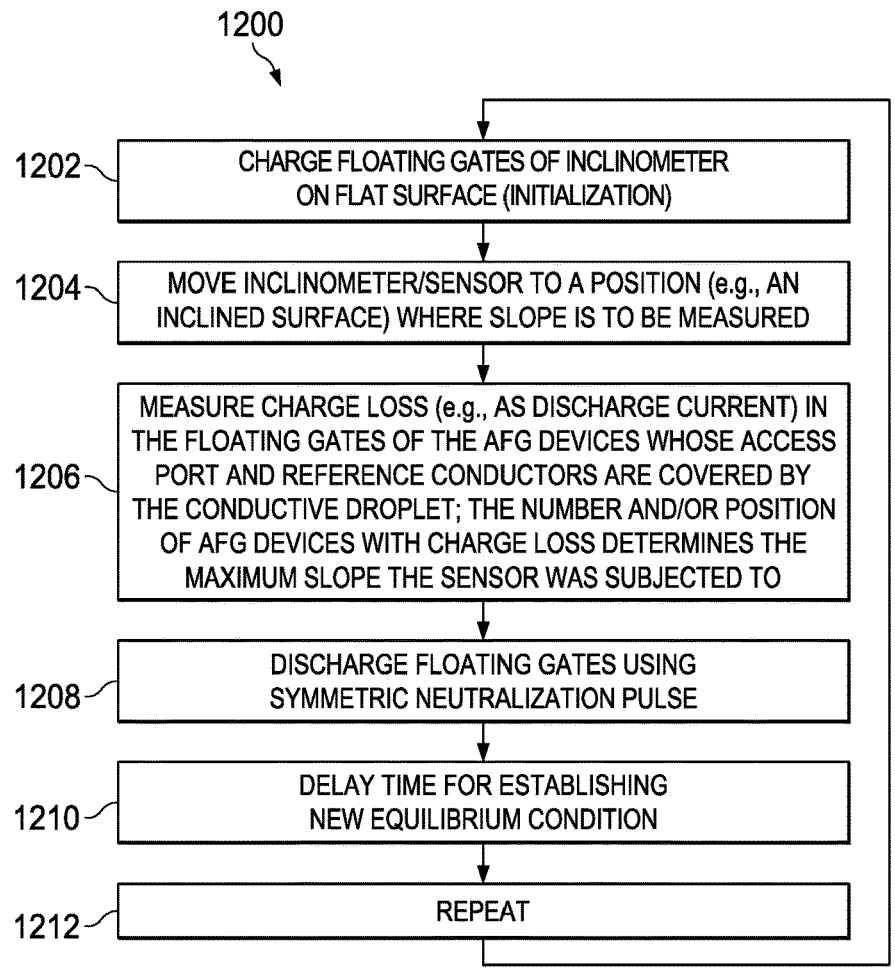
FIG. 12 is a flowchart of an example method of performing angular inclination measurements using an AFG inclinometer according to an embodiment of the present invention.

FIG. 12 is a flowchart of an example method of operation 1200, e.g., performing angular inclination measurements, with respect to using an AFG inclinometer according to an embodiment of the present invention. At block 1202, floating gate electrodes of an AFG inclinometer are charged, upon placing the inclinometer on a flat surface (e.g., a known reference horizon), by applying suitable bias voltages at the sensor circuit nodes, which voltages may be provided by an associated control circuit. The inclinometer is then moved to a position, e.g., an inclined surface, where angular inclination or slope is to be measured (block 1204). When the conductive liquid droplet of the inclinometer settles at a particular access port, the AFG device coupled to or associated with the access port experiences a charge loss in its floating gate electrode, thereby causing a reduced ID current. Depending on the implementation, one or more AFG devices may exhibit charge loss (e.g., if more than one access port is covered by the conductive droplet). As the position of such discharging AFG devices is calibrated to specific angles of inclination during manufacture, the presence or detection of the charge loss is used for determining or correlating the maximum slope that the inclinometer is subjected to, which may be output via a suitable user-friendly interface such as digital readout (block 1206). After the measurement process is completed, the floating gate electrodes of the AFG devices may be discharged by a suitable neutralization pulse (block 1208) in order to render the inclinometer suitable for a next measurement process. In one example embodiment, a floating-gate electrode of an AFG sensor may be neutralized by tunnel capacitors (e.g., capacitors 218, 220 in the embodiment of FIG. 2) so as to have no residual charge. A suitable neutralization process may be performed by applying a pulse of either or both an appropriate negative voltage (e.g., on the order of −10 volts) to terminal TN and an appropriate positive voltage (e.g., on the order of +10 volts) at terminal TP, both relative to a ground reference voltage applied to all other nodes (gate G, source S, drain D). This operation is intended to remove any residual positive charge and residual electrons from floating-gate electrode 210. Once neutralized in such process, floating-gate electrodes are at a known neutral state and may be then charged by the application of a bias voltage at gates G. Also, as there may be a temporary non-equilibrium depletion of charge at the sensing/access port due to the read operation, a waiting period or time delay may be needed before establishing a new equilibrium condition (block 1210). Thereafter, the process is repeated (block 1212) by recharging the floating-gate electrodes of the AFG inclinometer for a subsequent measurement operation.

Figure 13:
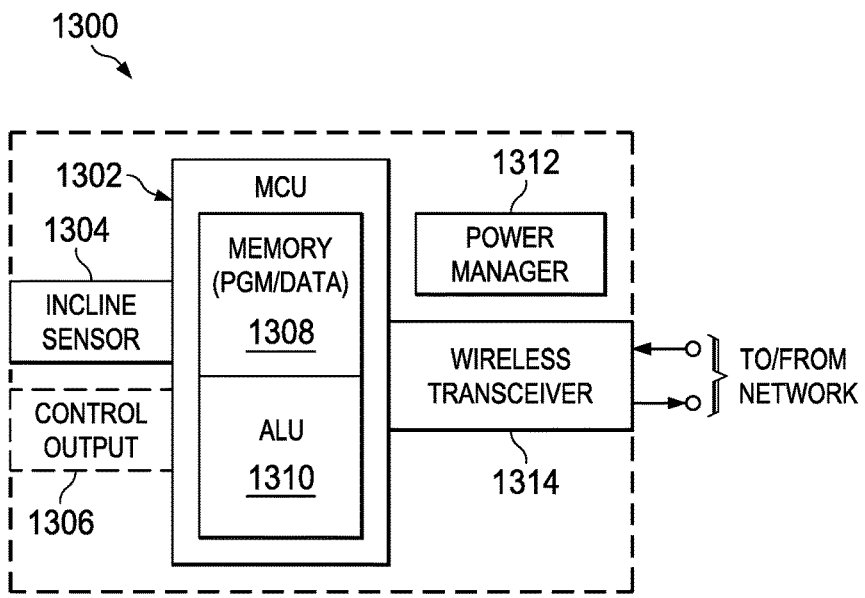
FIG. 13 depicts a block diagram of a node that includes an AFG inclinometer as a system or network element operative in a network.

FIG. 13 is a block diagram of a node 1300 that includes an AFG inclinometer as a system, apparatus or network element operative in a network. One skilled in the art will recognize that FIG. 13 is illustrative of a high-level architecture of a sensor node or network element in which an embodiment of the present invention may be implemented. By way of example, node 1300 may be contemplated for deployment in a distributed network system, for instance, as an Internet-of-Things (IoT) implementation. Node 1300 may preferably include a programmable subsystem including embedded microcontroller unit (MCU) 1302 in combination with various peripheral functions. For example, node 1300 may be physically realized by way of a single circuit board on which MCU 1302 may be mounted, along with other integrated circuits and discrete components as desired, housed in an appropriate housing or enclosure suitable for its environment. Alternatively, node 1300 may be realized by way of multiple circuit boards, as a single integrated circuit, or as a part of a larger electronic system, depending on its functionality. In the architecture of node 1300 depicted in FIG. 13, communication with other nodes and perhaps with a host computer system and/or network server(s) may be carried out by way of wireless transceiver 1314, constructed and operating in the appropriate manner for the particular communications facility being used. If communication is to be carried out wirelessly, any one of a number of conventional protocols and physical layer standards, including IEEE 802.11 a/b/g/n etc., Bluetooth, and Bluetooth 4.0 (i.e., Bluetooth Low Energy, or "BLE"), may serve as such communications facility. Alternatively or additionally, transceiver 1304 may be configured for communication over Ethernet or another type of wired network.

Node 1300 may also include one or more input/output (I/O) functions or interfaces for interacting with the physical environment external to the node. For example, an AFG-based inclinometer sensor device 1304 provided according to an embodiment of the present invention may be coupled to and controlled by MCU 1302. Optionally, a control output circuit 1306 may also be provided as part of node 1300, coupled to and controlled by MCU 1302 to realize a controller function. Examples of control output circuit 1306 may include analog output driver circuitry, serial and parallel digital outputs, pulse-width-modulated (PWM) output driver circuitry, driver circuitry for an alarm or an annunciator, and LED drivers, to name a few. As one skilled in the art will recognize, the particular numbers and functions of input/output functions may depend on the conditions and operations that node 1300 is to carry out in the networked system. Further, additional sensor and controller functions may also be included as part of node 1300, such as, for example, temperature sensors, motion sensors, humidity sensors, transducers of various types as suitable in industrial instrumentation, cameras, thermal imaging sensors, photosensors, and the like. Node 1300 may also include a power manager function 1312 for controlling the powering of the various functions within the node. For example, node 1300 may be powered by any one or more sources including wired power (e.g., power over USB, DC output from a rectifier or micro-grid), battery power, solar power, wireless power transfer (e.g., over the wireless communications facility or separately), and the like.

MCU 1302 in node 1300 may be configured to include certain functions particular to the construction and operation of this embodiment of the invention, for example by way of logic circuitry programmed to execute program instructions stored in a memory resource 1308 or received over the communications facility via wireless transceiver 1314. For example, at least a portion of the programmable logic may be represented by a logic unit ALU 1310, which operates in combination with memory resource 1308 that is also implemented within MCU 1302 in this example. One skilled in the art will recognize upon reference hereto that regardless of whether node 1300 is provided as a network element or not, at least part of the control circuit operations relative to AFG charging, recharging, application of neutralization pulses, correlation/determination of angular inclination (e.g., in multiple measurement modes such as degrees, radians, slope/gradient percentages, etc.) may be performed by or shared with MCU 1302 in one example implementation.

Based on the foregoing Detailed Description, skilled artisans will appreciate that embodiments of the present invention provide a fast, accurate and low-powered inclinometer solution for taking slope measurements electronically. Typically, power consumption of an AFG inclinometer of the present invention depends on measurement rates, as there may be repeated operations of charging/recharging and neutralization pulsing. An embodiment of the present invention can also be used without power to determine a maximum slope since the AFG sensors are non-volatile (the charge on the floating-gate electrodes is trapped because of the oxide layers surrounding them) and only those sensor ports at which a conductive droplet settles exhibit a discharge condition, thereby indicating appropriate slope measurements. In an example shipping application, an AFG inclinometer can therefore provide maximum slopes that a shipment has been subjected to during transit without having to power up the device. In a further arrangement where a shipping application may be deployed in an IoT setting, an inclinometer sensor module with Internet connectivity could periodically report the maximum measured slope since reset or the current slope measurement. It could also automatically communicate the maximum slope once the shipment reaches the destination or intermediate waypoints. Other applications in which an AFG inclinometer embodiment of the present invention may be advantageously deployed include but not limited to, for example, (i) detecting zones of ground or structural movement in civil engineering projects and establish whether movement is constant, accelerating, or responding to remedial measures; (ii) monitoring and checking that deformations are within design limits, e.g., struts and anchors are performing as expected, adjacent buildings are not affected by ground movements, etc., (iii) verifying stability of dams, dam abutments, and upstream slopes during and after impoundment, and (iv) monitoring settlement profiles of embankments, foundations, and other structures (e.g., deployed as a horizontal inclinometer).

It will be further recognized that an embodiment of the present invention can be easily incorporated into a complete electronic measurement system that may be networked or operated as a discrete entity (e.g., as node 1300 described above in one implementation), or as part of a larger system such as gaming appliances, cameras, etc. Other advantages of the present invention may include, among others: (i) ease of determination of zero offset; (ii) high accuracy and linearity, which is basically determined by the number of AFG devices used and the geometry of a microchannel; (iii) reduced sensitivity to temperature variations and drift (typically better resistance than other conventional methods); and (iv) better long term stability than other measurement approaches.

Although circular geometries for a microchannel have been particularly exemplified hereinabove, one skilled in the art will recognize that other curvilinear geometries are also possible for purposes of the present invention, as noted previously. Further, whereas a single microchannel having a circular design that is vertically oriented has been illustratively described, it should be appreciated that two microchannels each having appropriate numbers of sensor port electrodes may be orthogonally oriented relative to each other so that inclination along two axes (e.g., both pitch and roll of a surface) may be measured. In a still further variation, a full circular microchannel having a plurality of sensor port electrodes disposed along its periphery may be horizontally oriented such that the conductive liquid droplet may settle at a particular sensor port electrode that is calibrated to inclination around both X- and Y-axes.

Accordingly, although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An inclinometer, comprising:
   a semiconductor substrate;
   a dielectric layer over the semiconductor substrate, the dielectric layer defining a sealed arcuate microchannel containing a conductive liquid droplet;
   access port electrodes in the sealed arcuate microchannel, each of the access port electrodes associated with a reference electrode within a proximity of the respective access port electrode and disposed along a curvature of the sealed arcuate microchannel, the access port electrodes spaced from one another with an arc length that is calibrated to an angular inclination resolution; and
   analog floating-gate (AFG) devices in the semiconductor substrate, each corresponding to one or access port electrodes, wherein each of the AFG devices comprises a first conductor electrically coupled to the corresponding access port electrode and a second conductor electrically coupled to the reference electrode associated with the corresponding access port electrode.

2. The inclinometer as recited in claim 1, further comprising a control circuit coupled to each of the AFG devices, the control circuit configured to (i) detect a discharge current in at least one of the AFG devices along a conductive path between the corresponding access port electrode and the associated reference electrode interposed by the conductive liquid droplet, and (ii) determine an angular inclination measurement based on the detection of the discharge current of the at least one of the AFG devices.

3. The inclinometer as recited in claim 2, wherein each of the AFG devices further comprises:
   a floating gate;
   a metal oxide semiconductor (MOS) transistor having source and drain regions formed in the semiconductor substrate and separated from each other by a channel region, wherein a first portion of the floating gate is disposed over the channel region to serve as a gate electrode for the MOS transistor; and
   a storage capacitor including a first plate formed of a second portion of the floating gate, and a second plate separated from the first plate by a dielectric film,
   wherein the floating gate is in electrical contact with the first conductor and the second conductor is coupled to a ground reference voltage node.

4. The inclinometer as recited in claim 3, wherein the control circuit is coupled to the drain region of each of the AFG devices and to the second plate of the storage capacitor of each of the AFG devices, and configured to selectively bias the MOS transistor for charging the floating gates of the AFG devices before engaging in a measurement operation.

5. The inclinometer as recited in claim 4, wherein the control circuit is further configured to apply a neutralization pulse for discharging the floating gates of the AFG devices after the measurement operation.

6. The inclinometer as recited in claim 2, further comprising a communications transceiver coupled to the control circuit for communication of signals pertaining to the angular inclination measurement.

7. The inclinometer as recited in claim 1, wherein the conductive liquid droplet is sized to cover only one access port electrode and corresponding reference electrode when the conductive liquid droplet is settled at the access port electrode under gravity.

8. The inclinometer as recited in claim 1, wherein the conductive liquid droplet is sized to cover more than one access port electrode and corresponding reference electrodes for providing respective conductive paths therebetween when the conductive liquid droplet is settled under gravity, and further wherein the control circuit is configured to detect discharge currents in multiple AFG devices coupled to the respective multiple access port electrodes covered by the conductive liquid droplet and determine an angular inclination measurement based on respective positions of the multiple access port electrodes along the curvature of the sealed arcuate microchannel.

9. The inclinometer as recited in claim 1, wherein the dielectric layer defines a sealed arcuate microchannel forming at least a portion of a circle for measuring a predetermined maximum range of angular inclination.

10. The inclinometer as recited in claim 9, wherein the at least a portion of a circle comprises a semicircle for measuring ±90 degrees of angular inclination, and further wherein the access port electrodes comprise N access port electrodes, where N is selected based on the angular inclination resolution.

11. The inclinometer as recited in claim 10, wherein N=181 and the N access port electrodes are spaced from one another at an arc length calibrated to an angular inclination resolution of 1 degree.

12. The inclinometer as recited in claim 9, wherein the at least a portion of a circle comprises a quarter circle for measuring ±45 degrees of angular inclination, and further wherein the access port electrodes comprise N access port electrodes that are spaced from one another at an arc length calibrated to an angular resolution of 1 degree.

13. The inclinometer as recited in claim 1, wherein the reference electrodes corresponding to the plurality of access port electrodes are electrically connected together to form a ground reference strip.

14. A method of fabricating an analog floating-gate inclinometer, the method comprising:
   forming analog floating-gate (AFG) devices in a semiconductor substrate, wherein each of the AFG devices comprises a first conductor and a second conductor;
   defining an arcuate microchannel in a dielectric layer disposed over the semiconductor substrate, the arcuate microchannel including access port electrodes, each of the access port electrodes associated with a reference electrode formed within a proximity of the respective access port electrode and disposed along a curvature of the arcuate microchannel, the access port electrodes spaced from one another with an arc length that is calibrated to an angular inclination resolution;
   providing an electrical connection path coupling each access port electrode to the first conductor of a corresponding AFG device and an electrical connection path coupling the reference electrode associated with the access port electrode to the second conductor of the corresponding AFG device;
   injecting a conductive liquid droplet into the arcuate microchannel; and
   sealing the arcuate microchannel with a cap structure to form a sealed arcuate microchannel in the dielectric layer.

15. The method as recited in claim 14, further comprising providing a control circuit coupled to each of the AFG devices, the control circuit configured to (i) detect a discharge current in at least one of the AFG devices along a conductive path between the corresponding access port electrode and the associated reference electrode interposed by the conductive liquid droplet, and (ii) determine an angular inclination measurement based on the detection of the discharge current of the at least one of the AFG devices.

16. The method as recited in claim 14, wherein the sealed arcuate microchannel is formed as at least a portion of a circle for measuring a predetermined maximum range of angular inclination.

17. The method as recited in claim 16, wherein the at least a portion of a circle comprises a semicircle for measuring ±90 degrees of angular inclination, and further wherein the access port electrodes comprise N access port electrodes, where N is selected based on the angular inclination resolution.

18. The method as recited in claim 17, wherein N=181 and the N access port electrodes are spaced from one another at an arc length calibrated to an angular inclination resolution of 1 degree.

19. The method as recited in claim 16, wherein the at least a portion of a circle comprises a quarter circle for measuring ±45 degrees of angular inclination, and further wherein the access port electrodes comprise N access port electrodes that are spaced from one another at an arc length calibrated to an angular resolution of 1 degree.

20. The method as recited in claim 14, wherein the cap structure for sealing the arcuate microchannel is formed of a semiconductor wafer deposited with a cap dielectric material.

* * * * *